United States Patent
Andres et al.

(10) Patent No.: US 12,323,184 B2
(45) Date of Patent: Jun. 3, 2025

(54) VISIBLE LIGHT COMMUNICATIONS TECHNOLOGY FOR INTER-VEHICULAR USE

(71) Applicant: THE REGENTS OF THE UNIVERSITY OF MICHIGAN, Ann Arbor, MI (US)

(72) Inventors: Russell Andres, Riverview, MI (US); Michael William Putty, Grosse Pointe Woods, MI (US); Sridhar Lakshmanan, Belleville, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 108 days.

(21) Appl. No.: 17/897,319

(22) Filed: Aug. 29, 2022

(65) Prior Publication Data
US 2023/0065439 A1 Mar. 2, 2023

Related U.S. Application Data

(60) Provisional application No. 63/238,704, filed on Aug. 30, 2021.

(51) Int. Cl.
*H04B 10/69* (2013.01)
*H04B 10/116* (2013.01)
(Continued)

(52) U.S. Cl.
CPC ....... *H04B 10/116* (2013.01); *H04B 10/6931* (2013.01); *H04B 10/697* (2013.01); *H04L 7/048* (2013.01); *H04B 10/60* (2013.01)

(58) Field of Classification Search
None
See application file for complete search history.

(56) References Cited

U.S. PATENT DOCUMENTS

| | | | |
|---|---|---|---|
| 4,224,082 A | 9/1980 | Jacobson | |
| 4,331,829 A | 5/1982 | Palazzetti et al. | |

(Continued)

FOREIGN PATENT DOCUMENTS

| | | | |
|---|---|---|---|
| CN | 207701042 U | 8/2018 | |
| JP | 2003346521 A | 12/2003 | |

(Continued)

OTHER PUBLICATIONS

International Search Report and Written Opinion regarding International Application No. PCT/US2022/041964, dated Feb. 24, 2023.

(Continued)

*Primary Examiner* — Darren E Wolf
(74) *Attorney, Agent, or Firm* — Harness, Dickey & Pierce, P.L.C.

(57) ABSTRACT

A communication system comprising a light source associated with a first item of interest; a visible light communications system operably coupled to the light source of the first item of interest, the visible light communications system configured to process information as an encoded signal and output the encoded signal via the light source; and a receiver associated with a second item of interest, the receiver configured to receive the encoded signal from the light source and process the encoded signal to obtain the information.

5 Claims, 27 Drawing Sheets

(51) Int. Cl.
*H04B 10/60* (2013.01)
*H04L 7/04* (2006.01)

(56) References Cited

U.S. PATENT DOCUMENTS

| | | | |
|---|---|---|---|
| 4,338,480 A | 7/1982 | Antypas et al. | |
| 4,441,143 A | 4/1984 | Richardson, Jr. | |
| 4,601,064 A * | 7/1986 | Shipley | G06K 7/1097 340/8.1 |
| 4,746,370 A | 5/1988 | Woolf | |
| 5,068,865 A | 11/1991 | Ohshima et al. | |
| 5,110,368 A | 5/1992 | Otto et al. | |
| 6,060,658 A | 5/2000 | Yoshida et al. | |
| 6,223,675 B1 | 5/2001 | Watt et al. | |
| 6,469,649 B1 * | 10/2002 | Helkey | H03M 1/1245 341/143 |
| 6,504,633 B1 * | 1/2003 | Hovorka | H04B 10/116 398/183 |
| 7,797,939 B2 | 9/2010 | Green | |
| 8,146,527 B2 | 4/2012 | Pellen | |
| 8,553,742 B1 | 10/2013 | Wu | |
| 8,664,514 B2 | 3/2014 | Watters | |
| 8,787,420 B2 | 7/2014 | Kimoto et al. | |
| 8,860,165 B2 | 10/2014 | Okaniwa et al. | |
| 8,963,704 B2 | 2/2015 | Adami | |
| 9,008,520 B2 | 4/2015 | Yokoi | |
| 9,048,609 B2 | 6/2015 | Kim | |
| 9,059,558 B2 | 6/2015 | Zhu et al. | |
| 9,158,178 B2 | 10/2015 | Smeeton et al. | |
| 9,172,207 B2 | 10/2015 | Chen | |
| 9,180,551 B2 | 11/2015 | Paganelli | |
| 9,203,212 B2 | 12/2015 | Kurobe et al. | |
| 9,592,742 B1 | 3/2017 | Sosinov et al. | |
| 10,027,412 B2 | 7/2018 | Eroglu et al. | |
| 11,145,046 B2 | 10/2021 | Lakshmanan et al. | |
| 11,245,469 B2 | 2/2022 | Lakshmanan et al. | |
| 2004/0149988 A1 | 8/2004 | Shiozaki et al. | |
| 2006/0266407 A1 | 11/2006 | Lichy et al. | |
| 2007/0012353 A1 | 1/2007 | Fischer et al. | |
| 2008/0000518 A1 | 1/2008 | Basol | |
| 2008/0212981 A1 | 9/2008 | Yamada et al. | |
| 2008/0245401 A1 | 10/2008 | Winston et al. | |
| 2008/0289682 A1 | 11/2008 | Adriani et al. | |
| 2009/0009847 A1 | 1/2009 | Sasagawa et al. | |
| 2009/0040750 A1 | 2/2009 | Myer | |
| 2009/0272424 A1 | 11/2009 | Ortabasi | |
| 2009/0272425 A1 | 11/2009 | Green | |
| 2010/0212717 A1 | 8/2010 | Whitlock et al. | |
| 2010/0236609 A1 | 9/2010 | Tweedie | |
| 2011/0017256 A1 | 1/2011 | Stevens | |
| 2011/0061717 A1 | 3/2011 | Kwon et al. | |
| 2011/0290296 A1 | 12/2011 | Daniel et al. | |
| 2011/0305010 A1 | 12/2011 | Leadford et al. | |
| 2012/0080078 A1 | 4/2012 | Farrelly et al. | |
| 2012/0240982 A1 | 9/2012 | Corneille | |
| 2013/0038919 A1 | 2/2013 | Gibson et al. | |
| 2013/0112239 A1 | 5/2013 | Liptac et al. | |
| 2013/0174896 A1 | 7/2013 | Ardo et al. | |
| 2013/0192656 A1 | 8/2013 | Hardin et al. | |
| 2013/0192662 A1 | 8/2013 | Snidow | |
| 2013/0200709 A1 | 8/2013 | Kirchner et al. | |
| 2013/0346166 A1 | 12/2013 | Chihara | |
| 2014/0130851 A1 | 5/2014 | Osamura et al. | |
| 2015/0034147 A1 | 2/2015 | Le Perchec et al. | |
| 2015/0101761 A1 | 4/2015 | Moslehi et al. | |
| 2015/0144191 A1 | 5/2015 | Declerck et al. | |
| 2015/0336669 A1 | 11/2015 | Kantor et al. | |
| 2016/0049799 A1 | 2/2016 | Takatsu et al. | |
| 2017/0174092 A1 | 6/2017 | Kohnke | |
| 2019/0252565 A1 | 8/2019 | Lyons | |
| 2019/0323733 A1 | 10/2019 | Lv | |
| 2022/0060142 A1 | 2/2022 | Akhavan-Tafti | |

FOREIGN PATENT DOCUMENTS

| | | | |
|---|---|---|---|
| KR | 10-2010-0027379 A | 3/2010 |
| KR | 100973774 B1 | 8/2010 |
| KR | 20120013745 A | 2/2012 |
| KR | 20140028179 A | 3/2014 |
| KR | 20160015716 A | 2/2016 |
| KR | 20160043902 A | 4/2016 |
| KR | 20160133838 A | 11/2016 |
| KR | 20160142014 A | 12/2016 |
| KR | 20170024300 A | 3/2017 |
| KR | 20190118689 A | 10/2019 |
| WO | 2012/166048 A1 | 12/2012 |
| WO | 2015196296 A1 | 12/2015 |
| WO | 2017-097772 A1 | 6/2017 |

OTHER PUBLICATIONS

Trio Adiono et al., Analog Filters Design in VLC Analog Front-End Receiver for Reducing Indoor Ambient Light Noise, 2016 IEEE Asia Pacific Conference on Circuits and Systems (APCCAS), IEEE, Oct. 25, 2016, pp. 581-584.

Alin-Mihaicailean et al., Noise-Adaptive Visible Light Communications Receiver for Automotive Applications: A Step Toward Self-Awareness, Sensors, Jul. 5, 2020, pp. 1-12.

Bastien Bechadergue et al., Simultaneous Visible Light Communication and Distance Measurement Based on the Automotive Lighting, IEEE Transactions on Intelligent Vehicles, IEEE, Aug. 28, 2019, pp. 532-547.

Quan Ngoc Pham et al., Ambient Light Rejection Using a Novel Average Voltage Tracking in Visible Light Communication System, Applied Sciences, Jun. 29, 2017, pp. 1-9.

International Search Report and Written Opinion of the International Searching Authority regarding International Patent Application No. PCT/US2022/016614, dated May 31, 2022.

International Search Report regarding International Application No. PCT/US2021/047268 Dated Dec. 21, 2021.

International Search Report and Written Opinion mailed Apr. 29, 2020 regarding PCT/US2019/026580.

International Search Report and Written Opinion of the International Searching Authority issued in PCT/ JS2018/049880, mailed Nov. 21, 2018; ISA/US.

"3M Ultra Barrier Solar Film 510-F." 3M™ Ultra Barrier Solar Film 510-F, 3M, Oct. 2016, https://multimedia.3m.com/mws/media/12854700/3m-ultra-barrier-solar-film-510-f.pdf. (Year: 2016).

Liu, Ji-Tao, et al. "Curing Determination of EVA for Solar Panel Application by DSC." Curing Determination of EVA for Solar Panel Application, PerkinElmer, Inc, 2010, https://www.s4science.at/wordpress/wp-content/uploads/2018/10/EVA-Curing-for-Solar-Panels_DSC8000_APP.pdf. (Year: 2010).

Tomoyoshi Motohiro et al., "Concept of the solar-pumped laser-photovoltaics combined system and its application to laser beam power feeding to electric vehicles", Japanese Journal of Applied Physics, 2017.

International Search Report and Written Opinion of the International Searching Authority issued in PCT/US2020/059262, mailed Feb. 26, 2021, ISA/US.

D.-R. Kim, S.-H. Yang, H.-S. Kim, Y.-H. Son, and S.-K. Han, "Outdoor Visible Light Communication for inter-vehicle communication using Controller Area Network," in 2012 Fourth International Conference on Communications and Electronics (ICCE), Hue, Vietnam, Aug. 2012, pp. 31-34. doi: 10.1109/CCE.2012. 6315865.

Wang, Yiguang, Xingxing Huang, Jianyang Shi, Yuan-quan Wang, and Nan Chi. "Long-Range High-Speed Visible Light Communication System over 100-m Outdoor Transmission Utilizing Receiver Diversity Technology." Optical Engineering 55, No. 5 (May 2016): 056104.

Kim, Yong Hyeon, Willy Anugrah Cahyadi, and Yeon Ho Chung. "Experimental Demonstration of VLC-Based Vehicle-to-Vehicle Communications Under Fog Conditions." IEEE Photonics Journal 7, No. 6 (Dec. 2015): 1-9.

(56) References Cited

OTHER PUBLICATIONS

Rodriguez, Juan, Diego G. Lamar, Daniel G. Aller, Pablo F. Miaja, and Javier Sebastian. "Efficient Visible Light Communication Transmitters Based on Switching-Mode Dc-Dc Converters." Sensors 18, No. 4 (Apr. 2018): 1127.
Vega-Colado, Cesar, Belen Arredondo, Juan Carlos Torres, Eduardo Lopez-Fraguas, Ricardo Vergaz, Diego Martin-Martin, Gonzalo Del Pozo, et al. "An All-Organic Flexible Visible Light Communication System." Sensors 18, No. 9 (Sep. 2018): 3045.
Gordon Povey, "An IEEE Standard For Visible Light Communications", Visible Light Communications, Apr. 7, 2011.
"Shedding Light on LiFi", Pure LiFi, Aug. 2017.
"Deok Rae Kim et al., ""Outdoor Visible Light Communication For Inter-Vehicle Communication Using Control Area Network""", ICCE, 2012 (pp. 31-34). "
Harald Haas, "LiFi is a Paradigm-Shifting 5G Technology", Reviews in Physics, Oct. 27, 2017.
Mohamed Sufyan Islim et al., "The Impact of Solar Irradiance on Visible Light Communications", Journal of Lightwave Technology, vol. 36, No. 12, Jun. 15, 2018.
Saeed Ur Rehman et al., "Visible Light Communication: A System Perspective—Overview and Challenges", Sensors, Mar. 7, 2019.
Bugra Turan et al., "Vehicular Visible Light Communications", Intech, 2017.
Alin-Mihai Cailean et al.,"A Survey on the Usage of DSRC and VLC in Communication-Based Vehicle Safety Applications", IEEE, 2014.
Cen Liu, "Enabling Vehicular Visible Light Communication (V2LC) Networks", VANET' 11, Sep. 23, 2011.
Arnez Pramesti Ardi et al., "VLC-Based Car-to-Car Communication", Jurnal Elecktronika dan Telekomunikasi (JET), vol. 20, No. 1, Aug. 2020, pp. 16-22.
Trong-Hop Do et al., "Potentialities and Challenges of VLC Based Outdoor Positioning", IEEE, 2015.
Hossien B. Eldeeb et al., "Vehicle-to-Vehicle Light Communication: How to Select Receiver Locations for Optimal Performance", IEEE.
Mohammed Elamassie et at., "Effect of Fog and Rain on the Performance of Vehicular Visible Light Communications", IEEE, 2018.
Hossien B. Eldeeb et al., "MAC Layer Performance of Multi-Hop Vehicular VLC Networks with CSMA/CA", 12th International Symposium on Communication Systems, Networks and Digital Signal Processing, 2020.
Harald Haas et al., "What is LiFi?", Journal of Lightwave Technology, IEEE, 2015.
Harald Haas et al., "Introduction to Indoor Networking Concepts and Challenges in LiFi", Journal of Optical Communications and Networking, vol. 12, No. 2, Feb. 2020.
Pable Palacios Jativa et al., "Performance Analysis of OFDM-Based VLC Schemes in NLOS Channels", IEEE, Downloaded May 16, 2021.
S. Sivaguru, "A High Speen Open Access Visible Light Communication System Based on Intensity Modulation", International Journal of Science Technology & Engineering, vol. 3, Issue 08, Feb. 2017.
Rahul R. Sharma et al., "Implementation of a Simple Li-Fi Based System", International Journal of Computing and Technology, vol. 1, Issue 9, Oct. 2014.
Tahmid H. Talukdar et al., "Small Scale Wireless Data Transmission via Light Using Light Source", Proceedings of the International Conference on Engineering Research, Innovation, and Education 2017.
Soumyajit Chatterjee, "Point-to-Point Digital Communication using VLC (Visible Light Communication) and LiFi Technology", IEEE.

\* cited by examiner

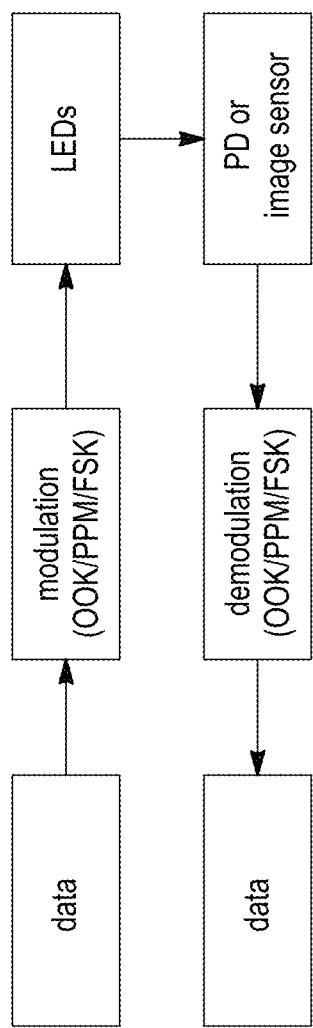
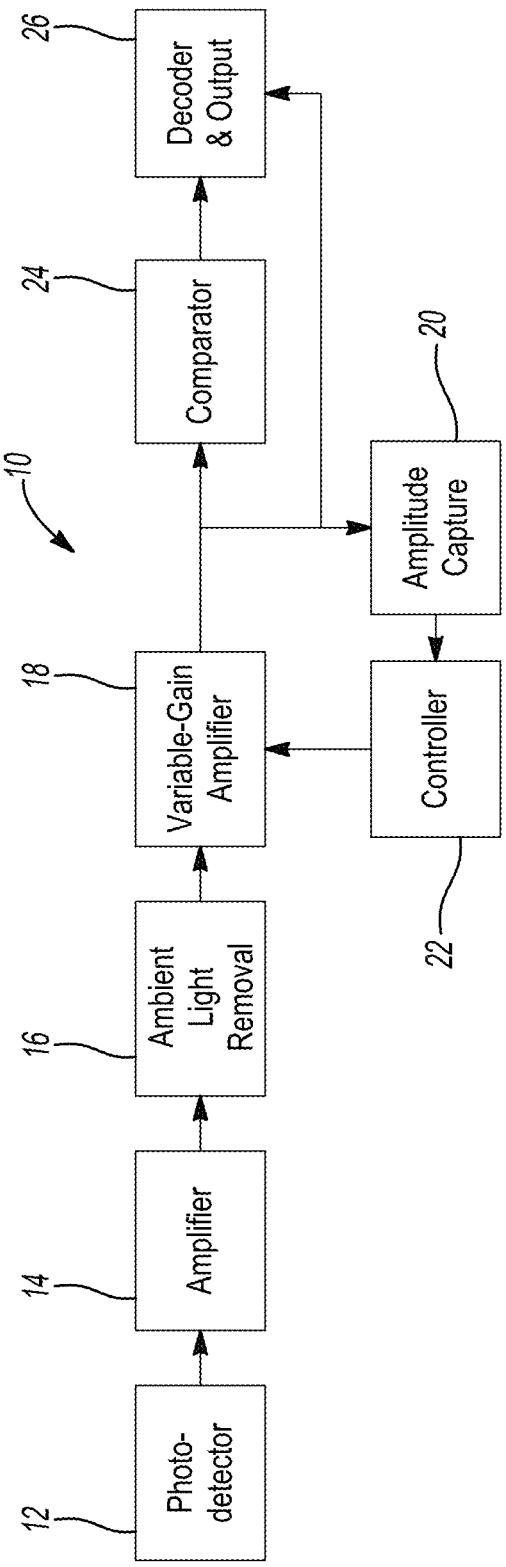
FIG. 1
Prior Art
FIG. 2

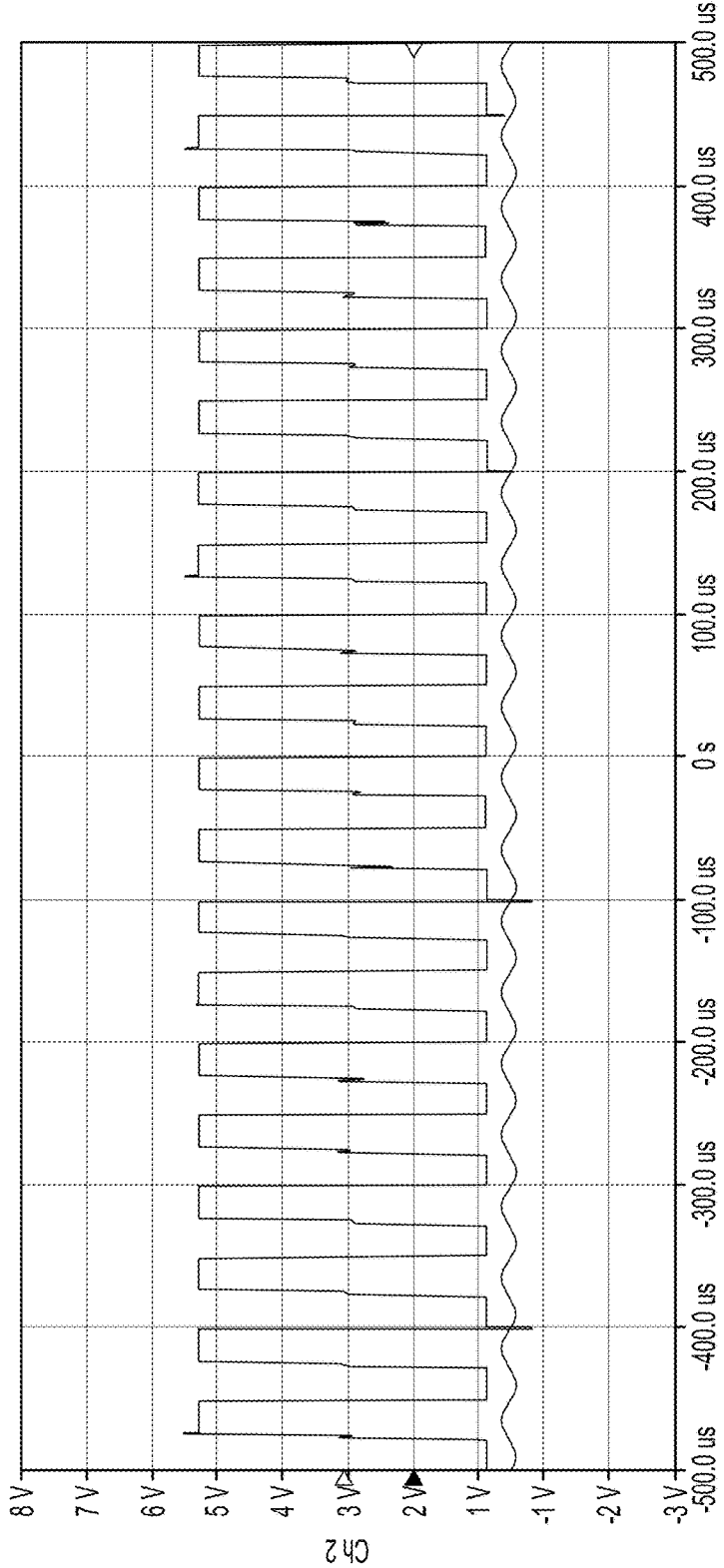
FIG. 13
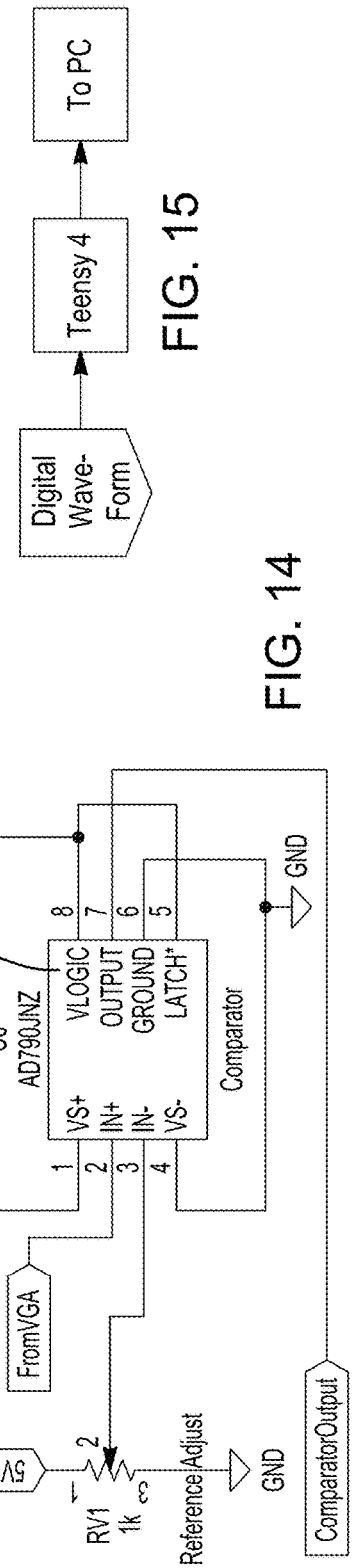
FIG. 15
FIG. 14

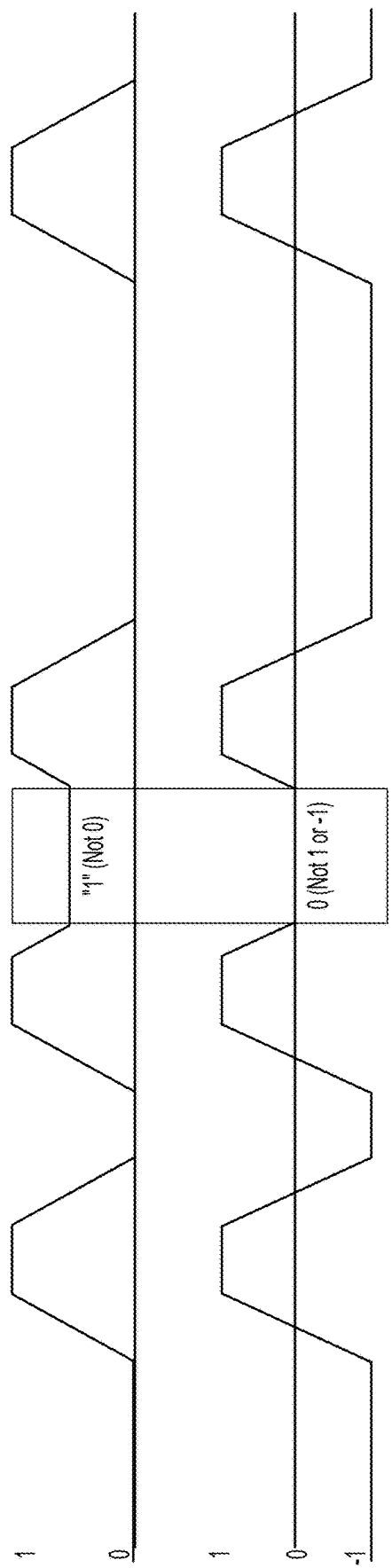
FIG. 24
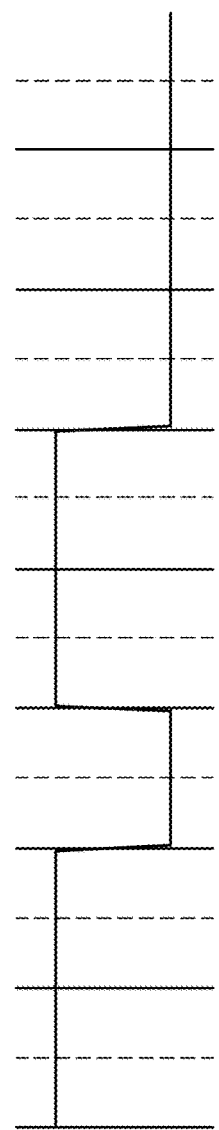
FIG. 25
S: {1,1,0,1,1,0,0,0,}
0: {1,0,1,0,0,0,0,1,1}
1: {0,0,1,0,1,1,1,0}
FIG. 26
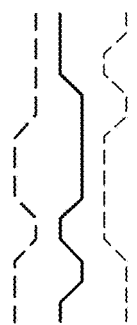
FIG. 27

NOTE: Times in comparisons are only approximately equal. This is to accommodate small amount of noise

VISIBLE LIGHT COMMUNICATIONS TECHNOLOGY FOR INTER-VEHICULAR USE

CROSS-REFERENCE TO RELATED APPLICATIONS

This application claims the benefit of U.S. Provisional Application No. 63/238,704, filed on Aug. 30, 2021. The entire disclosure of the above application is incorporated herein by reference.

FIELD

The present disclosure relates to for vehicle-to-vehicle mobile communications and, more particularly, relates to visible light communications technology for inter-vehicular communication.

BACKGROUND AND SUMMARY

This section provides background information related to the present disclosure which is not necessarily prior art. This section provides a general summary of the disclosure, and is not a comprehensive disclosure of its full scope or all of its features.

Autonomous vehicles currently use radio-frequency wireless technology to communicate with one another. This technology is promising, however presents several caveats. Radio systems emit signals in all directions and are susceptible to interference from surrounding radio signals. To safely transmit a signal, the radio transmitter would have to retransmit its message, adding to latency issues that could lead to critical accidents.

Visible light communications technology (VLC) uses visible light from ordinary light sources like LEDs to transmit data and is a promising prospect in place of radio waves. Challenges in this technology include the limited ways in which data can be encoded through light and disturbances from ambient and artificial light in nature. Key advantages of VLC include high bandwidth, short range, and minimal regulation.

The present disclosure provides details and schematic for a VLC receiver. In some embodiments, the VLC hardware design can convert ambient light and data signal into a waveform that can be easily processed by both analog and digital domains. In some embodiments, a system and reference circuit design for inter-vehicular (V2V) wireless communications using light is provided. Using adaptive filtering and automatic gain control techniques, usable bandwidth is attained for V2V applications while maintaining a reasonable range. In some embodiments, a method of encoding the data is provided for improved signal-to-noise ratio and reduced error rate, both of which are physically measured and confirmed on a system.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 illustrates how data is transmitted using VLC.

FIG. 2 illustrates a high-level hardware block diagram for the VLC system's receiver according to the present teachings.

FIG. 13 illustrates the input and output voltage waveforms of the comparator.

FIG. 14 illustrates the comparator section's schematic.

FIG. 15 illustrates a block diagram of the decoder.

FIG. 24 illustrates the difference between a digital and a bipolar signal.

FIG. 25 illustrates the double sampling of the decoder.

FIG. 26 illustrates the three chip sequences used in the Code Division version of the VLC system.

FIG. 27 illustrates an example character encoded via the Code Division protocol.

Corresponding reference numerals indicate corresponding parts throughout the several views of the drawings.

DETAILED DESCRIPTION

Figure 3:
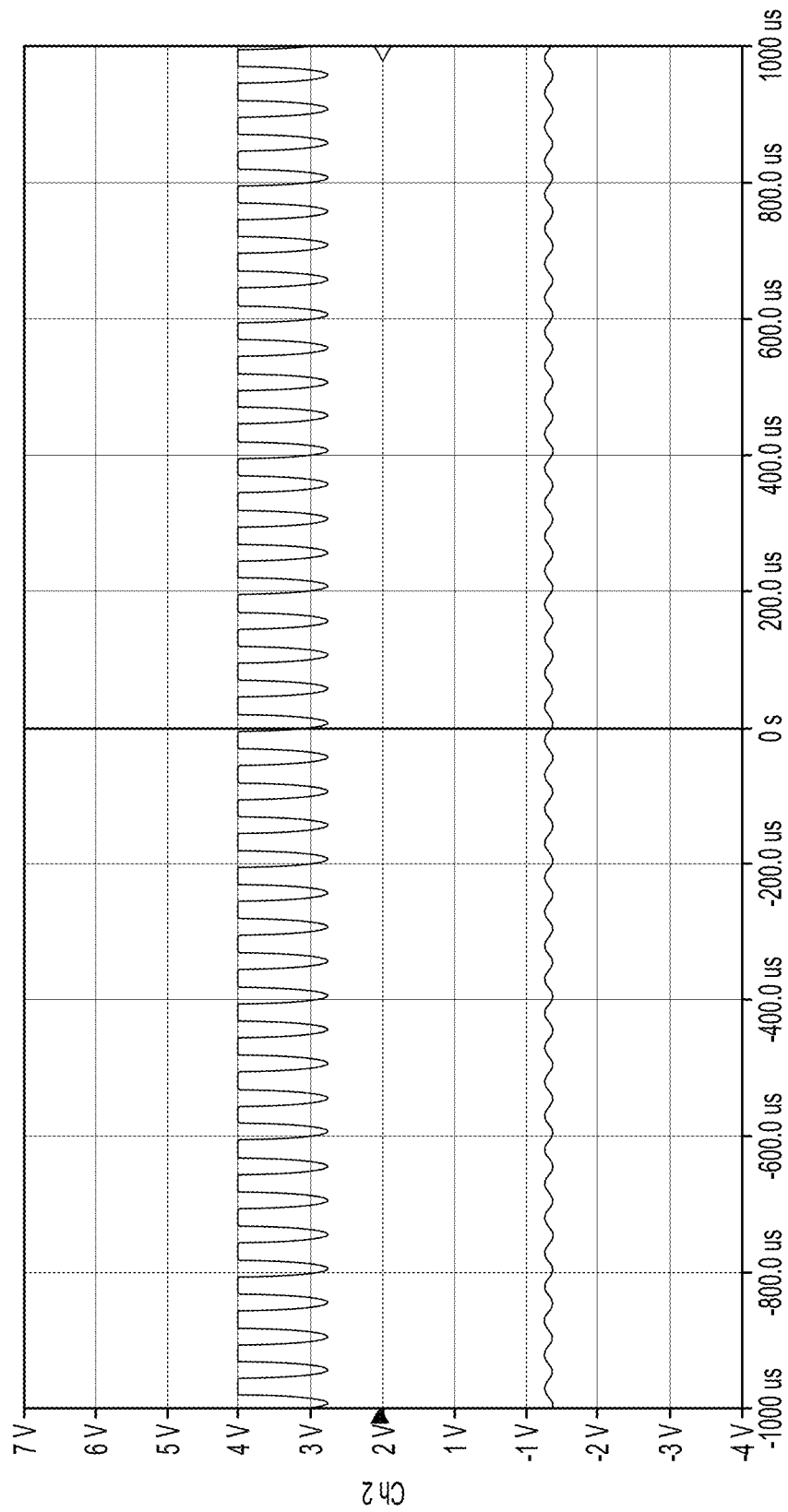
FIG. 3 illustrates the unwanted saturation of the amplifier when a high gain is applied to a signal from a photodetector.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In accordance with the teachings of the present disclosure, it should be understood that aspects of VLC, as described herein, make it apparent that it is a valuable future technology for communication and, particularly, in inter-vehicular communications.

Accordingly, in some embodiments, the present disclosure provides a VLC system that can be integrated into LED vehicle headlight or tail-light systems. The light can act as a transmitter to send encoded data to receivers located in or near the lights of other cars. Since the light is blocked if it travels too far or encounters another car, it is thus much less likely for interference to occur like it can in the case of a radio network. This is ideal, since only the vehicles immediately near the transmitting vehicle really need to know its headway, acceleration, or other information. Any other information can be provided just as well by the intervening cars, such as time to slow or stop when approaching a traffic light. Alternatively, both DSRC and VLC can be used together. DSRC can be used for less-frequent or broadcast-style announcements (or in non-line-of-sight conditions), while VLC simultaneously allows for local, low-latency communications. Alternatively, they can be used for complementary sides of the same link.

Introduction

Background

Visible Light Communications (VLC) uses visible light from ordinary light sources, usually LEDs, to transmit data in place of radio waves, as illustrated in FIG. 1. It has the advantages of being very high bandwidth, short range, fairly secure, and not being regulated. These factors are related. Light is naturally higher frequency, which means that transmission systems can be switched faster to send more data. Because the frequency is high, it is also blocked more easily by objects, which prevents the signal from travelling too far (which could cause signal interference and speed decreases) or leaving sealed rooms (which can allow eavesdropping). The lack of regulation is likely based on both the relatively new status of the technology and also on the fact that light is both sufficiently common and has such a large bandwidth that it would be difficult to start regulating it now.

Problem Statement

All of these aspects of VLC make it apparent that it is a valuable future technology for communication. There is one specific use of this technology that shows particular value, and that is in inter-vehicular communications.

Until recently, cars primarily were controlled by their drivers and signaling between the cars was in the form of simple, two-state visual or audible signals, such as brake lights, turn signals, or the horn. These were sufficiently comprehensible to another driver, but in the current age, automation and driver assistance systems have proliferated, and these systems are rather poor at reading the nuances of such uncomplicated signals, if they detect them at all. (Even the most modern algorithms have trouble with image processing, and it requires far more resources than any other task the car's computers might be doing.) As a result, cars now need to have signals that transmit more information in a form better understood by the vehicle's computers. Currently, this is provided via radio-frequency wireless systems such as Dedicated Short-Range Communications (DSRC) or Cellular Vehicle-to-Everything (CV2X, where the X could be infrastructure or other vehicles).

Unfortunately, radio systems indiscriminately send a radio signal in all directions, which interferes with nearby radios that may also be trying to send at the same time. To safely transmit, the radio must either wait until no other radios are sending (which cannot be easily known, since the very medium it communicates over is also the resource it needs to use) or attempt to re-send its message if it gets corrupted by another radio transmitting at the same time. This results in a latency issue, and while that is permissible when browsing the Internet or when using a mobile phone, a delay of a safety-critical message between connected vehicles can contribute to accidents.

As mentioned, however, light is directional, has a limit on how far it can travel, and is significantly impeded when traveling past an intervening vehicle. This means that messages can be sent using VLC that will by nature stay within the immediate neighborhood of nearby vehicles, which is also the main area where these messages are relevant, and it cannot travel further to interfere with more than a few other vehicles' communications. The higher bandwidth of optical systems also means that more data can be sent, or that the same amount of data can be sent with less latency; both of which are potentially helpful when designing future intelligent vehicles.

Design Overview

According to the teachings of the present disclosure, a VLC system 10 is provided that can be integrated into LED vehicle headlight or tail-light systems. The light would act as a transmitter to send encoded data to receivers located in or near the lights of other cars. Since the light is blocked if it travels too far or encounters another car, it is thus much less likely for interference to occur like it can in the case of a radio network. This is ideal, since only the vehicles immediately near the transmitting vehicle really need to know its headway, acceleration, or other information. Any other information can be provided just as well by the intervening cars, such as time to slow or stop when approaching a traffic light. Alternatively, both DSRC and VLC can be used together. DSRC can be used for less-frequent or broadcast-style announcements (or in non-line-of-sight conditions), while VLC simultaneously allows for local, low-latency communications. Alternatively, they can be used for complementary sides of the same link.

Review of Existing Strategies and Related Works

VLC is currently a very popular technology. A large number of people are conducting research in this field with varying results. Some companies, notably PureLiFi, have had great success with the technology in an indoor setting. Fewer focus on the outdoor or vehicular environment, because it has proven to be more challenging.

As a demonstration of the difficulty in building a high-performing VLC system, several groups have designed VLC data transmitters that are limited to ranges of at most three meters or a data rate measured in tens of bytes per second even in an indoor environment. S. Sivaguru, B. Sundari, and N. Rupavathi have designed an RS-232-based system that achieves 115200 baud, but that is limited to a distance of 2.3 meters at night (1.76 meters during the day) and a 3% error rate due to the use of an unamplified, direct-to-digital comparator without ambient light compensation fed by a photodetector and voltage divider. Despite the unusual design choice, the receiver appears as if it could be configured to work in any light level, although it would require manual adjustment the moment that the ambient light level changed.

Tahmid H. Talukdar and Shahadat H. Parves developed a system that transmits data using an atypical variant of PWM where a short logic low followed by a long logic high represented a 1, and a long logic low followed by a short logic high represented a 0. The transmitter was an entire office light panel rated for 18 watts at 20 volts. For the sensor, it used a BPW34 photodetector and a voltage divider apparatus that was manually tuned to produce a voltage that would trigger a digital pin if the transmitting light was on, but provide zero volts with the light off. This would be highly dependent on the ambient light in the room and has a limited overall range of operation. The eventual data rate was revealed to be only 78 bytes per second, or 624 bits per second, and the range of the system was not given.

A final example comes in the form of a system produced by researchers at the University of Engineering and Management in Kolkata in West Bengal, India. Their encoding was a unique pulse-count design that used three light pulses to represent a 1, and two pulses to represent a 0. This protocol deserves further research for its self-synchronizing properties and because it can be designed to ignore other frequencies. Their receiver uses the same BPW34 detector and voltage divider design as Talukdar and Parves, but, rather than a digital conversion, they used the analog-to-digital converter of an Arduino microprocessor to detect the change in light level. The data rate was 50 bits per second over a distance of one foot after manual adjustment to the detector to calibrate it to the room's ambient light.

In contrast, Harald Haas is a pioneer in the field of optical data transmission. He coined the term LiFi in 2011 and went on to found the company PureLiFi, focusing on the idea of a fully integrated visible-light networking stack. While his research is predominantly on indoor VLC, it has been so influential that it requires a mention. By 2015, he and his team had developed transmitter and receiver Application-Specific Integrated Circuits (ASICs) for high-speed optical data transfer. The benefit of designing the components using an ASIC is the ability to integrate all of the required components like detectors or digital-to-analog converters right alongside custom-designed hardware that can rapidly process the data going to or from the other components.

Haas's transmitter is capable of 25 million samples per second transmission of analog light signals across a total of eight channels for color-shift keying, multiuser support, or dimming. It is capable of 1 GB/s transmit rates when using all channels at once. His receiver, meanwhile, contains 49 acutely sensitive avalanche photodiodes in a grid formation with some of them featuring color or directional tuning for use with more complex protocols. He also championed the idea to use both RF and optical data transmission together for improved overall performance. Since then, a 3 Gbps data rate was demonstrated with a micro-LED, a type of LED designed to have a faster switching time than the normal variety.

In the field of vehicular VLC communication, researchers from Yonsei University implemented a vehicular VLC system that transmitted a signal taken directly from the vehicle's CAN bus over a distance of 20 meters at 500 thousand baud with a receiver design similar to the one discussed in the present disclosure. Unfortunately, the data sent over their network was not actually decoded and used, merely read by an oscilloscope. Their receiver had problems with the presence of sunlight and required an optical filter and a "light shield" to function properly outdoors. From their article, it appears that this may be due to the use of a second "limiting" amplifier that was mainly used to reduce the gain of the detector amplifier, likely resulting in the first saturating quite easily due to its high gain setting.

Similarly, researchers at Telkom University designed a car-to-car VLC network that used UART to send data at 38400 baud between vehicles at up to 11 meters at night. In the day, the range was limited to 2 meters. The data being sent was extracted from a vehicle's CAN bus and included brake, gas, and speedometer readings. Solar cells were used to detect the light signal.

Hossien B. Eldeeb, Evsen Yanmaz, and Murat Uysal (in Turkey) have simulated a VLC network that uses a digital modulation scheme based on IEEE 802.15.7 that achieves a 30-meter range (21 meters in fog) and uses a carrier sense multiple access/collision avoidance scheme to prevent collisions of transmitted messages. It additionally uses multi-hop retransmission of packets to further increase the range of the data being sent. The data rate is unlisted.

Cen Liu, Bahareh Sadeghi, and Edward W. Knightly have designed a system with a 100 kilobit-per-second data rate and apparent range of 101 meters that is highly resistant to passive interference of different frequencies or saturation from ambient light sources including sunlight, but is highly sensitive to any signals due to its use of Manchester encoding. An important part of this ability is from a bandpass filter that is used to reduce the sensitivity of the circuit to any frequencies other than that of the designated transmitter. Their highly interesting design outperforms that of this thesis, but the use of a Code Division algorithm makes this VLC system 10 more resilient against noise in general while its hardware leaves it nearly as immune to ambient light as Liu, Sadeghi, and Knightly's system.

Challenges of an Optical System

Despite the fact that radio frequencies and light are both on the electromagnetic spectrum, they have very different behaviors. Information can be encoded directly into a radio signal in multiple ways (changing the power, changing the frequency, or changing the phase) but even with LEDs or lasers, light can only be adjusted in frequency or amplitude, and creating or detecting frequency changes requires different hardware for each frequency. Transmitting data with light thus requires vastly different hardware and new encoding techniques compared to radio. A common approach is known as "intensity modulation," the transmission of data by turning the light source on and off, and many advanced protocols are still rooted in this technique.

Additionally, most radio bands do not have natural sources and diffract around solid objects, while light is commonly produced by numerous competing, non-data sources and is easily blocked. As a result, some facets of transmitting with VLC have a number of complexities that do not appear in radio-frequency data transmission: interference, clock recovery, ambient light, and signal strength changes. These need to be resolved before VLC can be used as a viable means of communication.

Interference

Interference is merely the first of the problems that complicate VLC data transmission outdoors. Both natural and artificial light sources can interfere with data transmissions, as can some weather conditions. Natural interference sources can include sunlight, reflected sunlight (including from puddles), and lightning. Artificial sources include lights on other vehicles (both traditional and VLC), light sources on pedestrians or bicyclists, street lighting, and home or business lighting. Because this thesis focuses on the feasibility of VLC being used to communicate between vehicles, light changes from the car's motion are also a factor to be considered. In addition to actual light sources interfering, the signal itself can be scattered or attenuated by airborne substances like dust, snow, or fog, although rain has only a minimal effect.

Attenuation from fog or dust is a large issue, since the signal from the transmitter is already difficult to detect. This can be mitigated by increasing the sensitivity of the receiver, but that makes it more susceptible to interference from other light sources and may reduce the maximum speed of the channel. This is, however, a problem that radio signals are mostly unbothered by and which can be mitigated by the use of a combined VLC/DSRC communication suite.

Artificial light sources will likely be the largest problem faced by a workable VLC solution. Many modern electronics inadvertently emit high-frequency modulated light as a result of brightness control or from a previously harmless side effect of their power supply's operation, but to VLC this can be a source of strong interference. This was even seen during early testing of the VLC system 10's brightness response when an LED flashlight did not properly filter its output and caused the system to pick up a high-frequency signal that was not supposed to be there.

Competing VLC sources are likely to cause at least some degree of interference as well. If they use the same protocol, the limited number of cars that can receive (or interfere with) any given signal will be handled by the protocol itself. If multiple standards are in use and the receivers or transmitters are not capable of detecting the signals of other standards, it is possible for adjacent vehicles to talk over each other and reduce the signal quality of the other. This is made worse if one of the protocols is sensitive to noise.

Finally, most natural light sources are unlikely to cause interference problems because they are relatively constant, and any changes are extremely infrequent. Sunlight with intermittent cloud cover or reflections caused by sunlight, however, can temporarily overwhelm the receiver, causing the loss of reception for a fraction of a second. Lightning can also overwhelm the receiver, especially in otherwise dark conditions. In most cases, reception will resume in short order, but the danger lies in the chance that extremely fast and urgent transmissions may potentially be missed during these events. This is a safety issue that can be solved by ensuring that important messages are sent with enough time for the receiving vehicle to react, requiring a form of acknowledgement to the message or it will be re-sent, transmitting them multiple times to begin with, or by filtering out certain frequencies of light from the receiver. The last is infeasible since that would greatly reduce the available bandwidth and would also prevent the dual use of vehicle headlamps for both data transmission and illumination. The others cause some degree of overheard but allow the use of normal channels.

Ambient Lighting

Ambient lighting is actually a problem for VLC systems, at least if there is enough of it. This is for three reasons:

1. It reduces the sensitivity of detectors slightly. A detector in a dark environment can trust that the photons it detects are solely from the transmitter, but as the ambient light increases, more and more of the photons are from the ambient light instead. This reduces its ability to discern the actual signal source. This is especially true of the incredibly sensitive avalanche photodetectors, since they are capable of detecting single photons by liberating their entire charge on a detection event. Such detectors need to recharge faster than new photons arrive, or else the sensitivity is reduced proportionally and the upstream components have to be able to detect smaller signals from the unprimed detector.

2. The detector can simply saturate. If it is exposed to far too much light, something that is easy for sensitive or high-gain detectors to do, the output of the detector or its amplifier will reach the highest voltage that it is capable of providing. Further increases in light level (as might be provided by the transmitter switching on) will be ignored as it is physically incapable of reporting them.

3. The receiver blindly reports the brightness of the light in front of the sensor. It does not know what the source of that light is. A reading of 2.45 volts might be due to the transmitter turning on, or the transmitter might actually be off and there is a lot of ambient light. Because the encoded signal also relies on the light's intensity, the decoder or receiver has to autonomously discard the ambient light levels, or it will try to "decode" it in place of the much smaller signal from the transmitter.

Signal Strength Changes

The last challenge is from changes in signal strength. Even with ambient-light filtering, the amplitude of the received signal coming from the detector is very important. If the amplitude decreases too much, the decoder will fail to receive any data or it will trigger on noise instead. At the same time, the gain of the detector cannot be too high or ambient light saturation could occur instead. Additionally, increased gain also increases the amount of noise in the system.

System Implementation

The VLC system 10 discussed in the present disclosure was designed from the ground up in all three parts: hardware, transmission protocol, and software. It is intended to solve a number of problems seen with other outdoor VLC designs and features increased range. The receiver of VLC system 10 uses hardware to clean up the received signal before it passes into the signal decoder, resulting in increased performance. The encoding and software are also designed to reduce the influence of noise on the signal for further improvements.

Hardware Design

FIG. 2 illustrates a high-level hardware block diagram for the receiver of the VLC System 10. A well-known difficulty with operating outdoor VLC systems at range stems from the fact that the very medium they use to communicate is also shared with natural and artificial sources that are not attempting to send carefully encoded data. Additionally, interference may also stem from other VLC sources or improperly filtered non-VLC LED light sources. Lastly, for long-range VLC systems, the amplitude of the signal will decrease as the range increases, making it difficult to detect the signal. Yet, if the detector's gain were to be increased to better detect distant sources, it would saturate on sunlight in the daytime and miss the transmitter's signal anyway.

FIG. 3 This image shows the saturation of the amplifier (blue) when a high gain is applied to a signal from a photodetector (orange). The detector has both a DC offset and an AC amplitude, but the amplifier applies the gain to both, cutting off the desired signal when it can no longer increase its output.

The proposed design of the VLC hardware in the present disclosure will convert the combined ambient light-and-data signal into a bipolar waveform that can be easily processed in both the analog and digital domains depending on the requirements of the user. Digital processing is faster and cheaper, but may be more error-prone. Analog detection is slower but allows more advanced techniques to better remove noise. The design also features an improved multi-part amplifier configuration that will allow for the detection of distant signals without saturating the detector. The addition of an improved clock recovery system is also possible but is beyond the scope of this thesis.

Figure 4A:
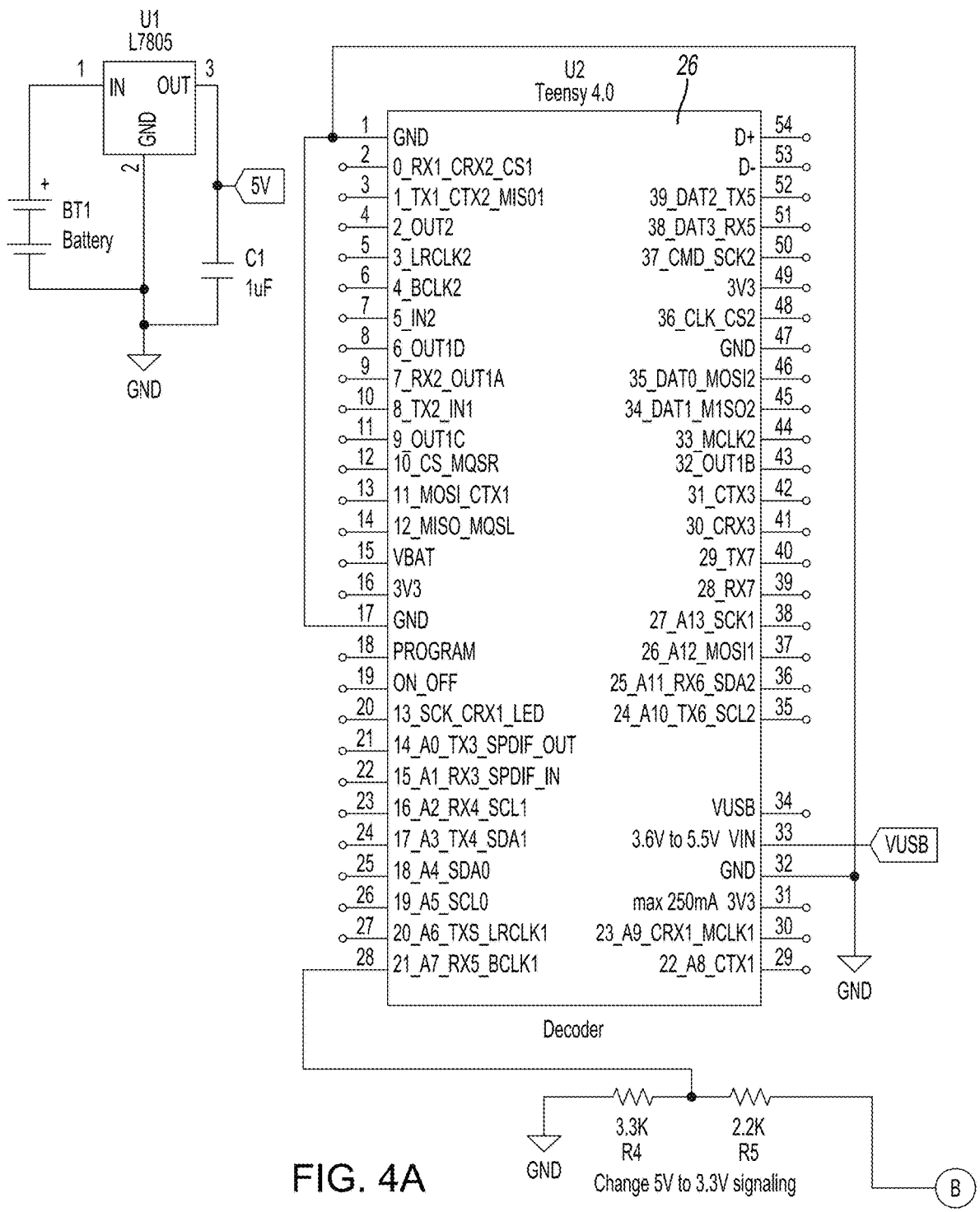
FIG. 4 illustrates a schematic for the VLC system's receiver.
Figure 4B:
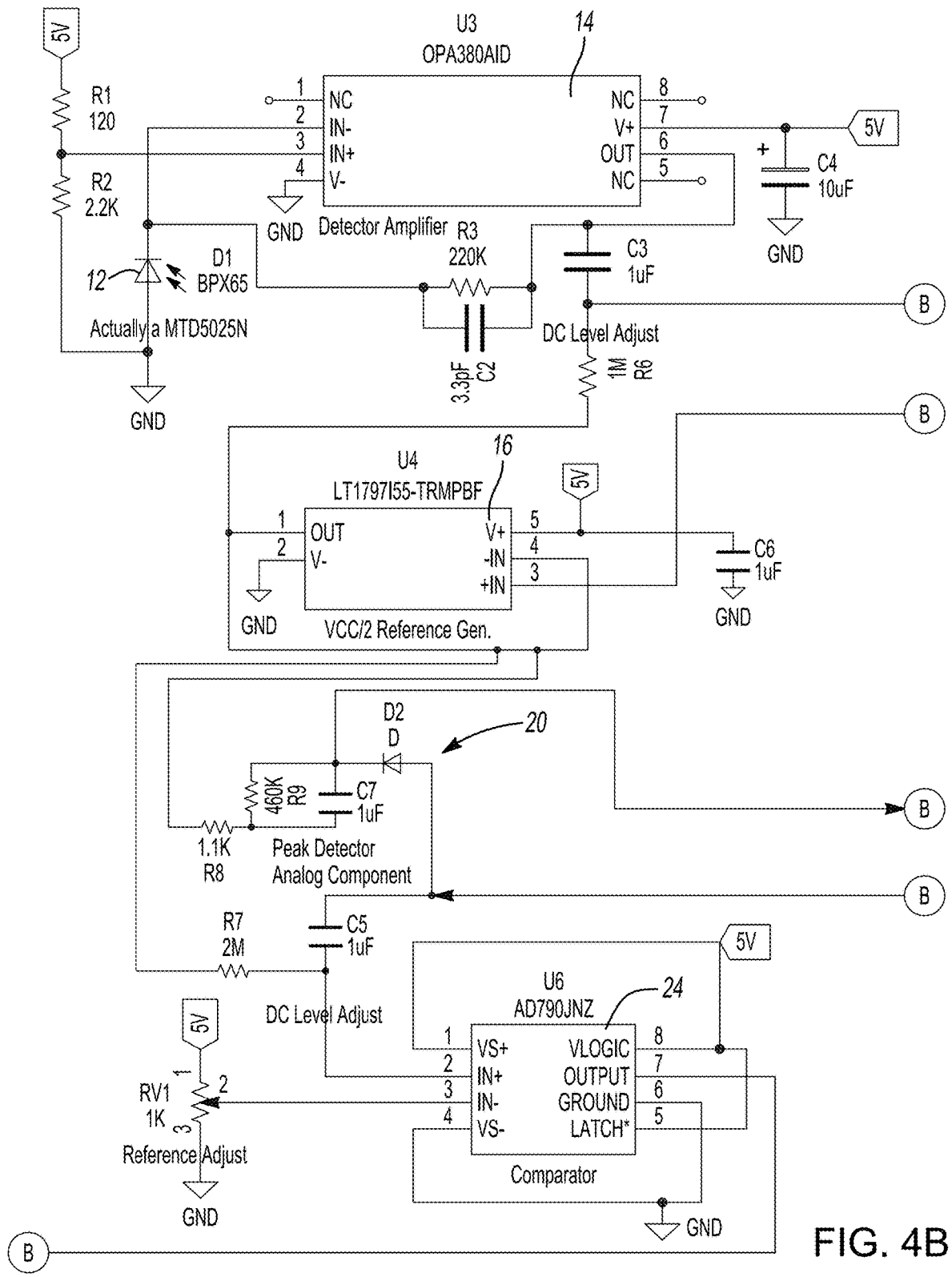
Figure 4C:
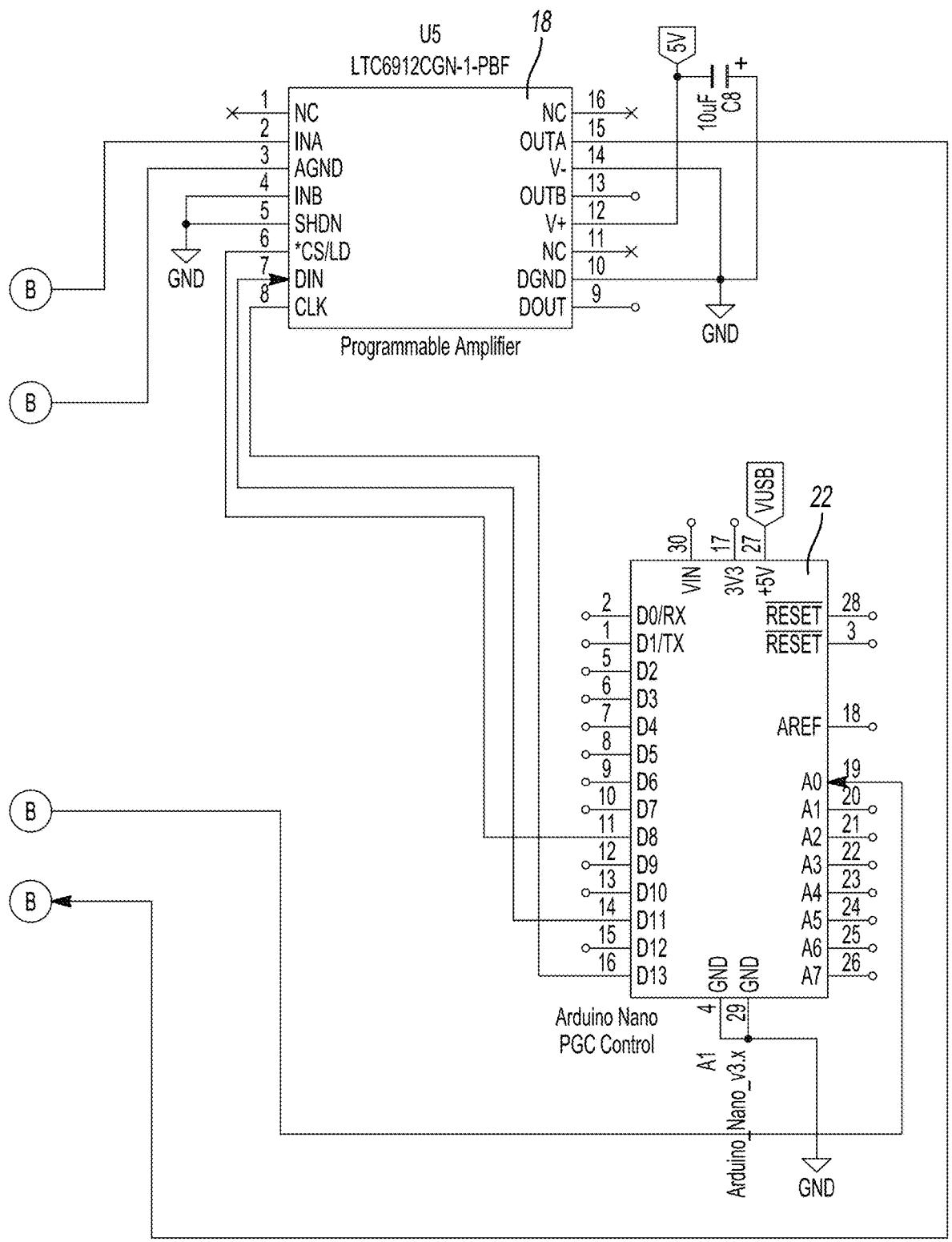

FIG. 4 illustrates a schematic of the VLC System's Receiver

Transmitter

The transmitter used with the proposed system was a 12V, 20-watt LED vehicle headlamp with a 8.17° vertical field of view and a 62.53° horizontal field of view. Modulation was established through an RFP30N06LE power MOSFET controlled by a Teensy 4.0 microprocessor (just like the one used in the receiver).

Figure 5:
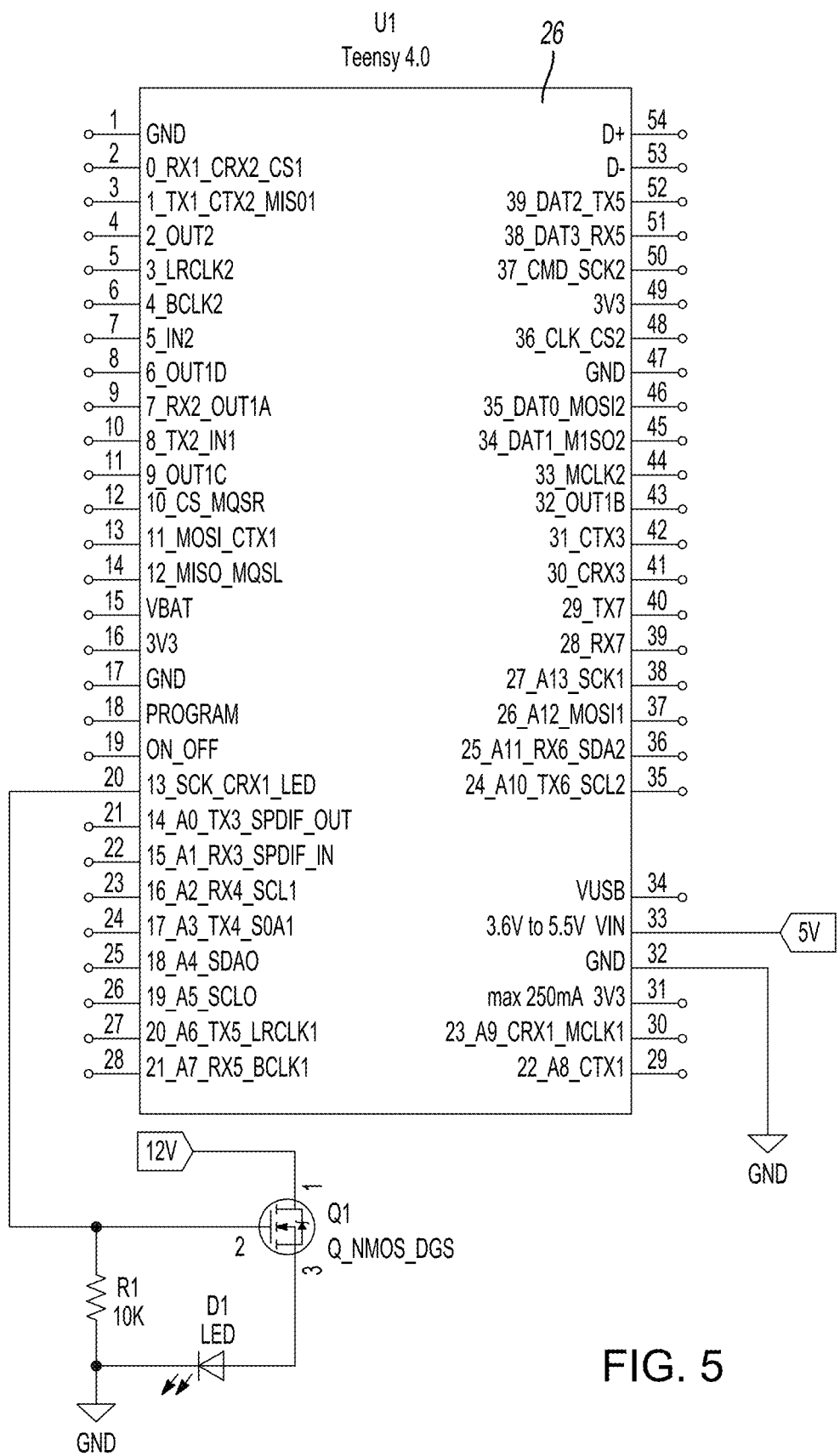
FIG. 5 illustrates a transmitter circuit used for testing the VLC system.

FIG. 5 illustrates the transmitter circuit used for testing the VLC system. The Teensy microcontroller is responsible for digitally switching the LED at high speed to produce a fixed-amplitude digital signal.

Light Sensor

The VLC system 10's receiver is composed of multiple stages, as seen in FIG. 2. The first stage of the receiver, the light sensor 12, detects and amplifies visible light, primarily in the blue light range. This is most directly associated with the original color of a white LED, and will have less time-domain blurring caused by the white phosphors. Optionally, an optical filter could also be added to further focus the receiver's sensitivity to only the light frequency of the transmitted signal.

Figure 6:
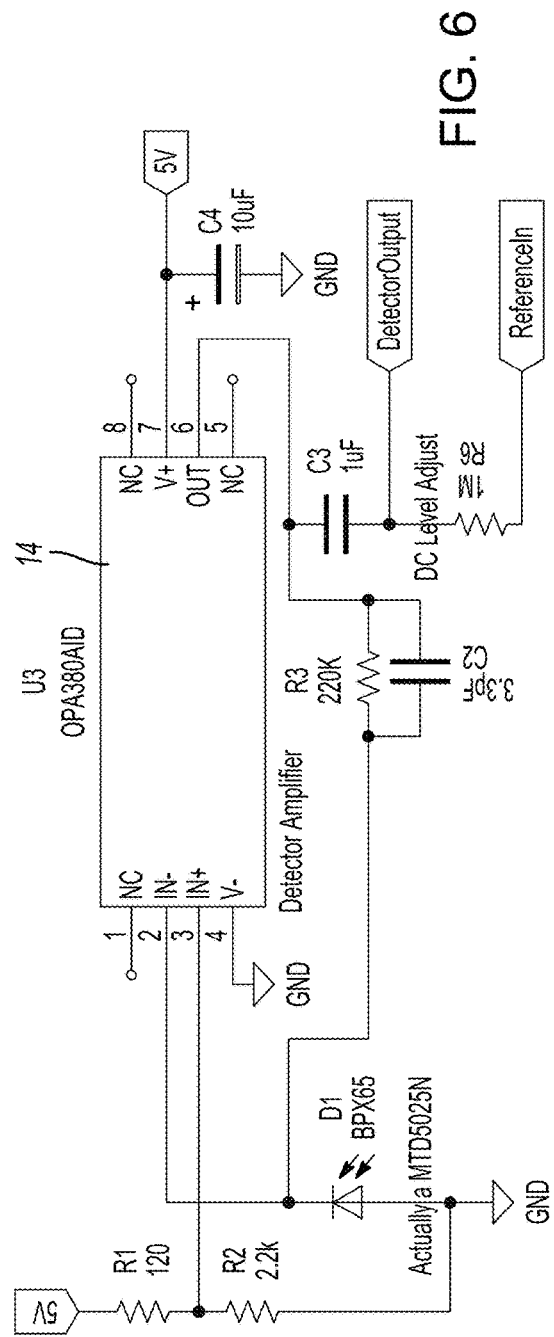
FIG. 6 illustrates a photodetector stage's schematic.

FIG. 6 illustrates the photodetector 12 stage's schematic. The photodector 12 stage is composed of a highly sensitive MTD5025N photodiode 12 and an OPA380 op-amp 14 designed for optical transimpedance amplification purposes. The system avoids ambient light saturation by limiting gain and by using a directional photodetector to ensure that the signal being detected is from the transmitter, but this has also resulted in the system itself being highly directional. If this were to be put into production, multiple detectors would likely be needed to cover all angles the vehicle might receive from.

Table 1 provides details of the photodetector 12 used from the manufacturer's datasheet.

Noise Filtering

Ambient light levels usually change slowly, so the output of the detector 12 is capacitively coupled through a high-pass filter (C3 and R6 in the schematic see FIG. 6), causing the mostly constant component from ambient light to be bled off while the high-frequency signal is allowed to pass.

Figure 7:
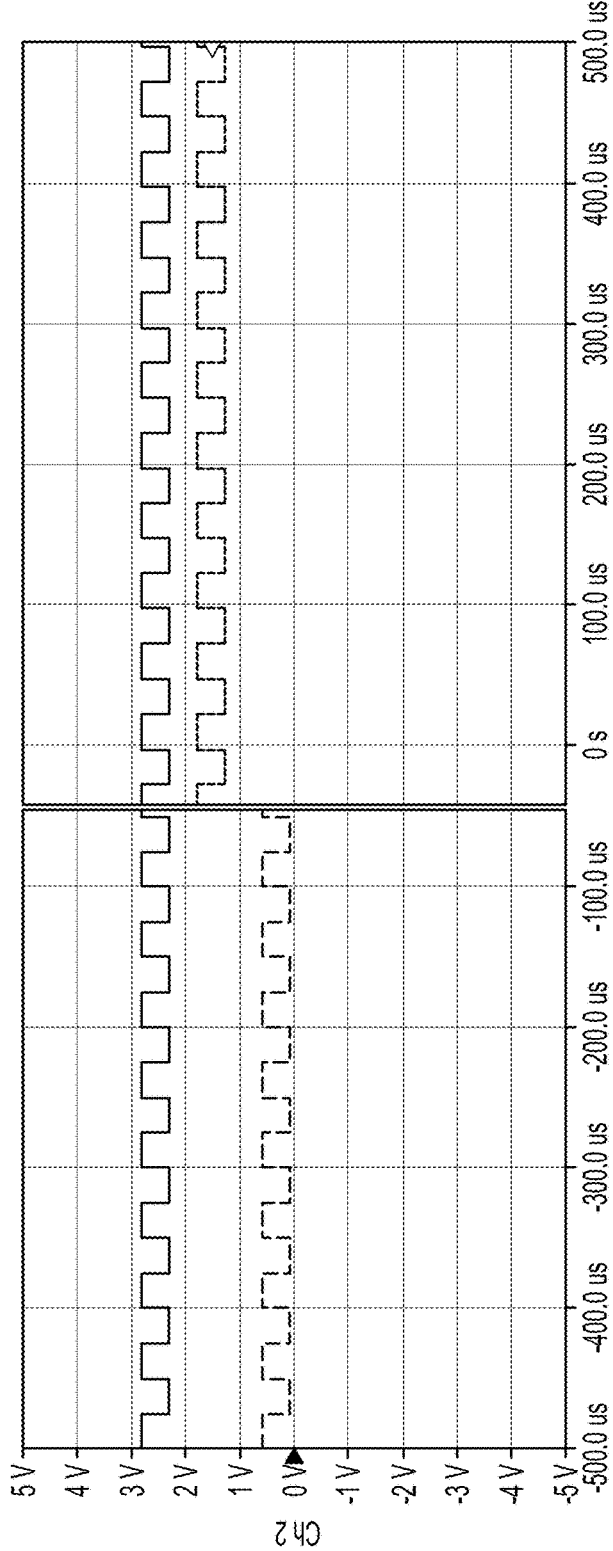
FIG. 7 illustrates an oscilloscope trace that shows how the output signal is unaffected by the dc voltage offset caused by ambient light on the sensor.

FIG. 7 illustrates oscilloscope trace that shows how the output signal (top) is unaffected by the DC voltage offset caused by ambient light on the sensor 12.

Another benefit of the filter 16 is that its resistor is connected to a 2.5 volt reference. This converts the incoming signal into a bipolar one centered on the same 2.5 volts, making it suitable for both digital conversion and for more complex encoding protocols.

Figure 8:
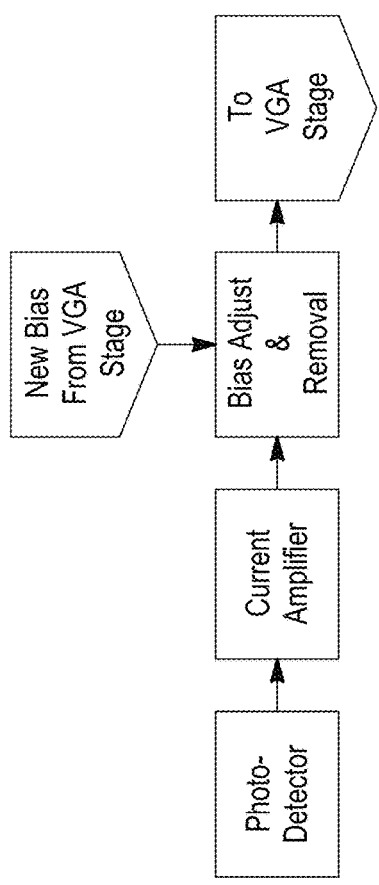
FIG. 8 illustrates a photodetector and noise removal stages' hardware block diagram.

FIG. 8 illustrates the photodetector and noise removal stages' hardware block diagram.

Adaptive Signal Gain Subsystem

The adaptive signal gain stage of the receiver comprises several discrete components, a second, dedicated microcontroller, a buffer op-amp, and a LTC6912variable-gain amplifier 18 (VGA). The buffer op-amp provides the variable-gain amplifier's 18 (VGA's) reference voltage to other parts of the system (such as the noise filter 16), but the voltage is also used internally to ensure the most stable and clean operation of the variable-gain amplifier 18 (VGA) stage itself.

Figure 9:
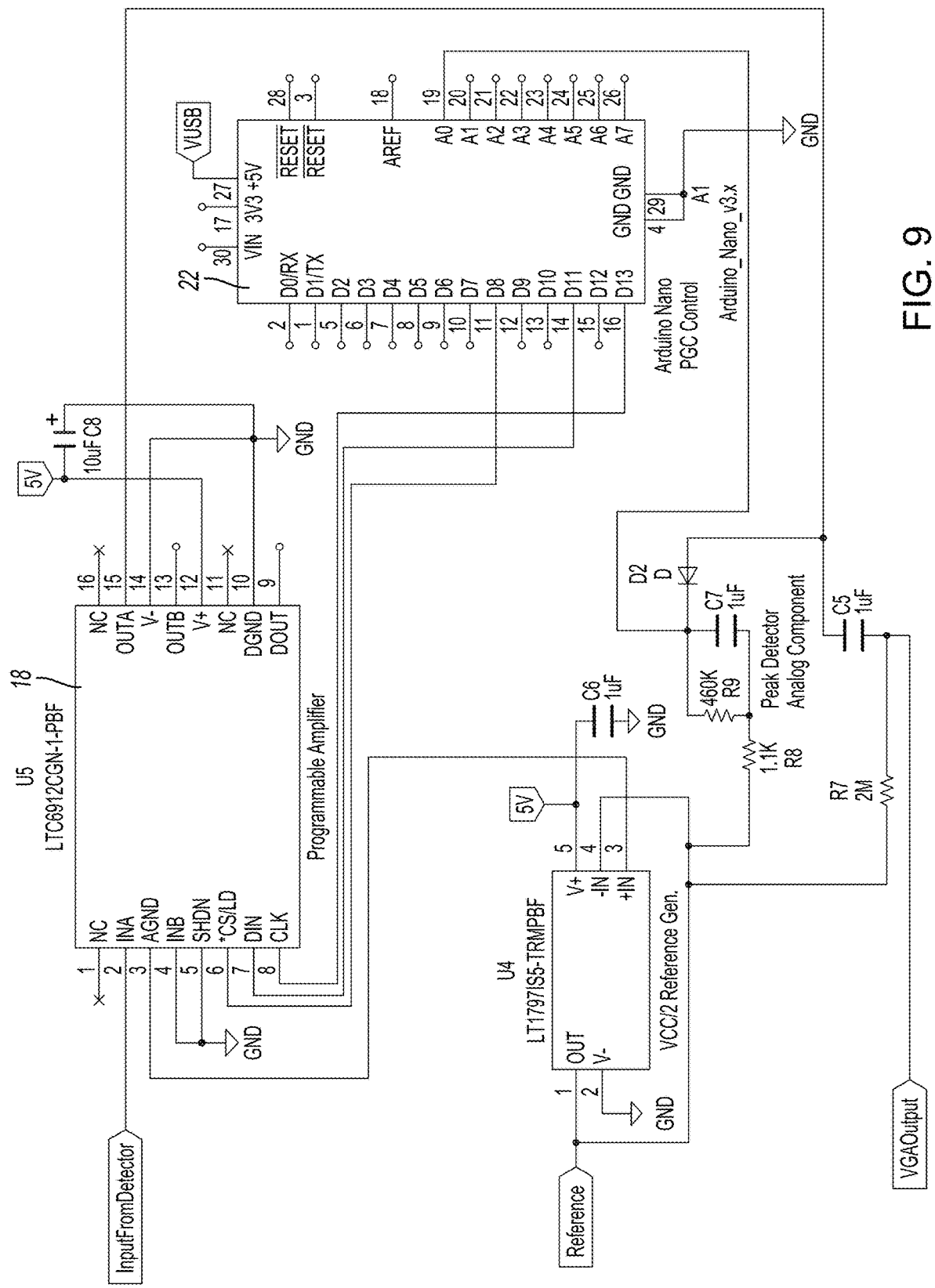
FIG. 9 illustrates a VGA amplifier subsystem's schematic.

FIG. 9 illustrates the variable-gain amplifier 18 (VGA) subsystem's schematic.

The detector's 12 signal, once it has been filtered (at 16), now comprises the visible light communication VLC signal centered around a known reference voltage, but the signal could be weak and hard to detect if the transmitter is far away. Noise could be mistaken for the signal and cause an error. Conversely, if the receiver's gain is increased to detect distant signals better, ambient light could overwhelm the receiver and block out the actual data (as seen in FIG. 3). The high-pass filter 16 would then block the ambient light's signal, but there would still be no data present for downstream components to detect. However, using a second amplifier 18 with adjustable gain allows the circuit to normalize small (or large) signals and scale the signal to a relatively fixed amplitude. The second amplifier 18 keeps the signal at a level that can be easily measured while minimizing added noise and keeping a safe gain in the detector.

Figure 10:
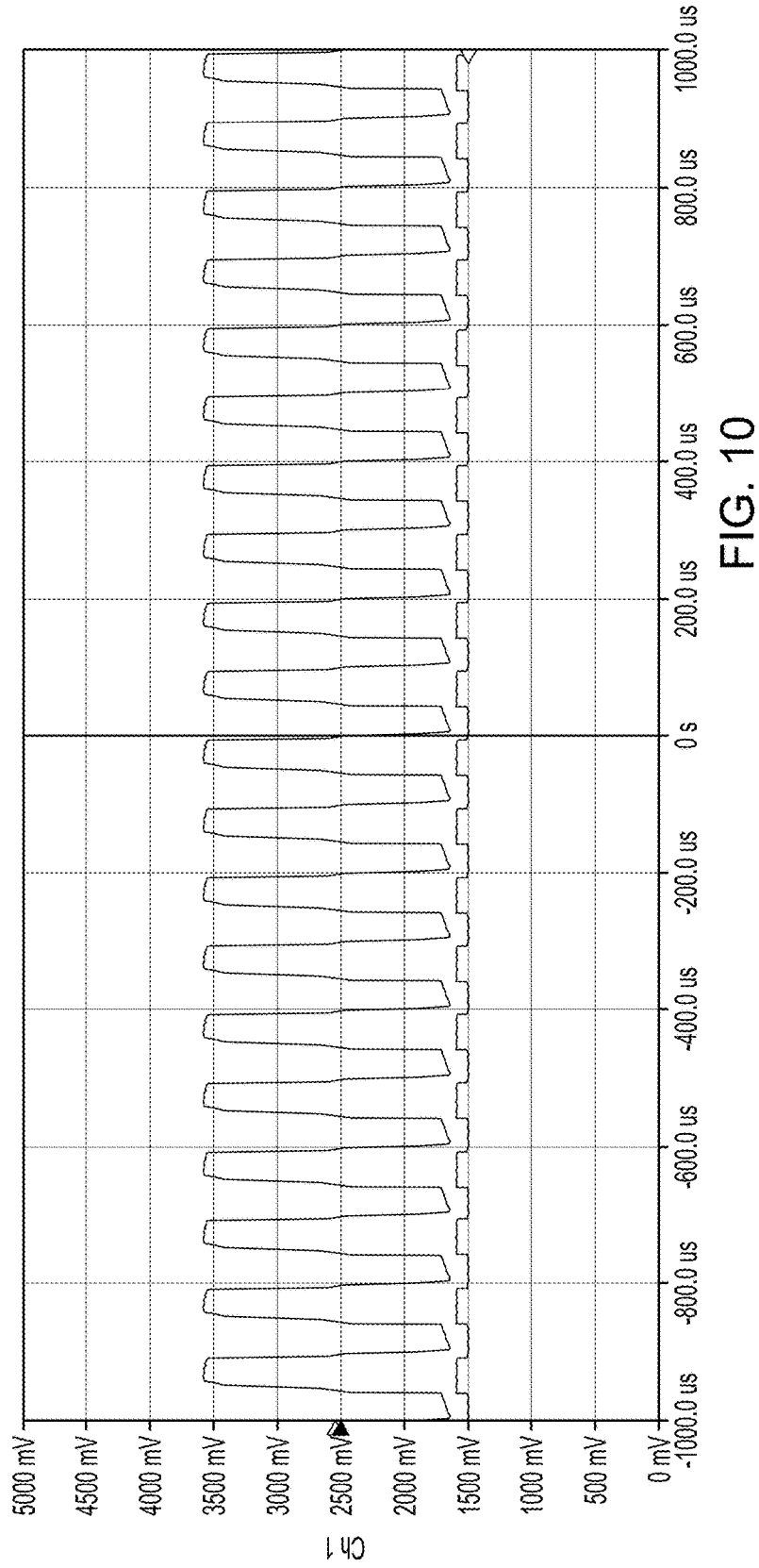
FIG. 10 illustrates how the filter and second amplifier can work together to remove ambient light while emphasizing the signal portion of the detected light.

FIG. 10 illustrates an input signal (lower) from the detector has a DC offset of 1.5volts from the first amplifier's gain acting on ambient light. Despite the gain, the signal amplitude is still small. The input signal can be passed through the filter stage 16 previously discussed and then to the second amplifier 18, which is now able to selectively increase only the signal and not the ambient light portion. The much larger (upper) signal is the result.

Figure 11:
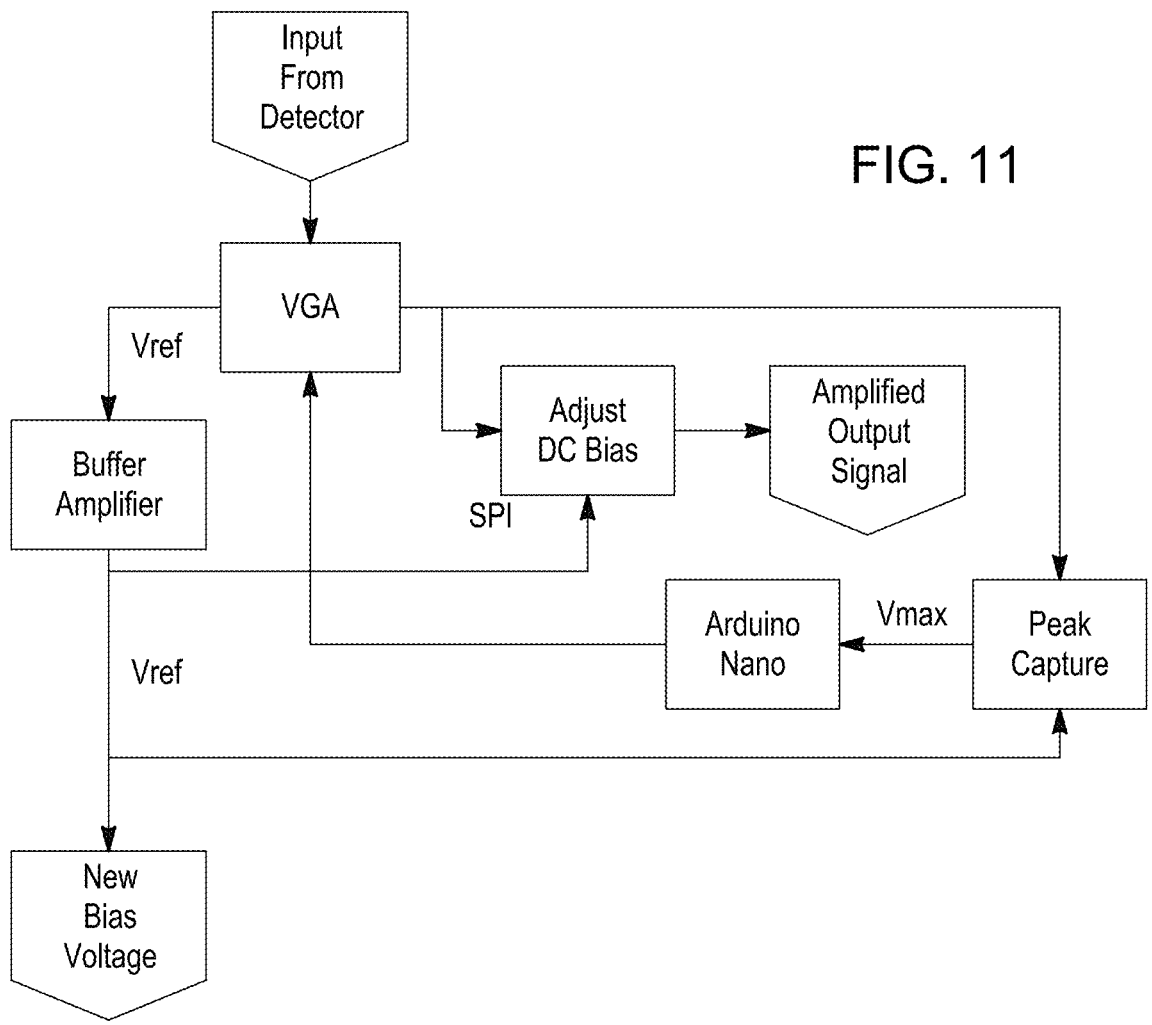
FIG. 11 illustrates a VGA amplifier subsystem's block diagram.

The adjustment process begins with an amplitude capture stage 20 including reading the amplitude of the input signal via a diode (FIG. 4B-D2) and storing the value in a capacitor (FIG. 4B-C7) to detect the peak voltage, at which point a microcontroller 22 (with an isolated power supply to reduce interference) determines if increasing or decreasing the signal gain of the variable gain amplifier is necessary to maintain a minimum amplitude. The amplifier used in the visible light communication VLC system 10 has fixed gain levels, so the microcontroller 22 has to consider if it is safe to adjust the gain level in the event that the new gain produces a signal outside the configured bounds in the opposite direction. If this is the case, the microcontroller 22 will choose the option that keeps the higher of the two potential gain settings to avoid the signal potentially becoming too small to detect. FIG. 11 illustrates the variable-gain amplifier 18 VGA amplifier subsystem's block diagram.

Table 2 illustrates the gain levels of the variable-gain amplifier 18 VGA as listed in the datasheet.

The controller 22 also has a small waiting period to ensure that the low or high amplitude reading that would cause a change is not simply due to a spurious signal but that it is actually needed. The output of this stage (variable gain amplifier 18 controlled by the controller 22 based upon amplitude capture 20) is, ideally, a signal with a larger amplitude that is easy to interpret for the later stages of the receiver (see FIG. 10).

Digitization

Figure 12:
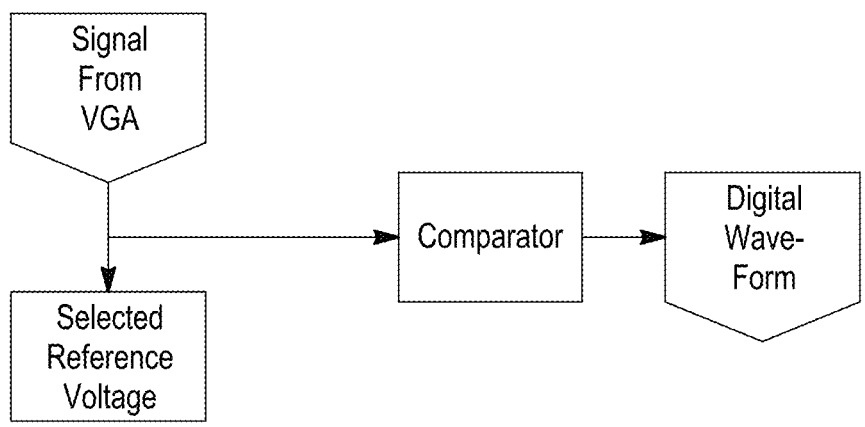
FIG. 12 illustrates a comparator section's block diagram.

The next stage of the receiver is built upon an AD790 precision comparator 24. FIG. 12 illustrates the comparator 24 section's block diagram. The incoming signal from the second variable gain amplifier 18 stage varies around a center voltage, so by comparing this signal with a selected reference voltage at or near the center, the AD790 will rapidly slew its output to produce a digital result representing whether the voltage of the incoming signal is greater than the reference signal.

FIG. 13 illustrates a graph that shows the input and output voltage waveforms of the comparator 24. When the input (lower) crosses the reference voltage (not shown due to limitations of the test equipment), the output (upper) switches almost instantly to 0 volts (if the input is below the reference) or 5V (if the input is above the reference).

The reference adjustment is set manually, once, to choose a point in the signal near the variable-gain amplifier's 18 (VGA's) bias voltage where it rarely if ever deflects due to noise. In ideal operation, the variable-gain amplifier 18 (VGA) keeps the incoming signal large enough that received data passes the chosen voltage level and causes the comparator to output a digital "1." This result may then be interpreted directly by the receiving microprocessor. FIG. 14 illustrates the comparator 24 section's schematic.

Decoding

Figure 16:
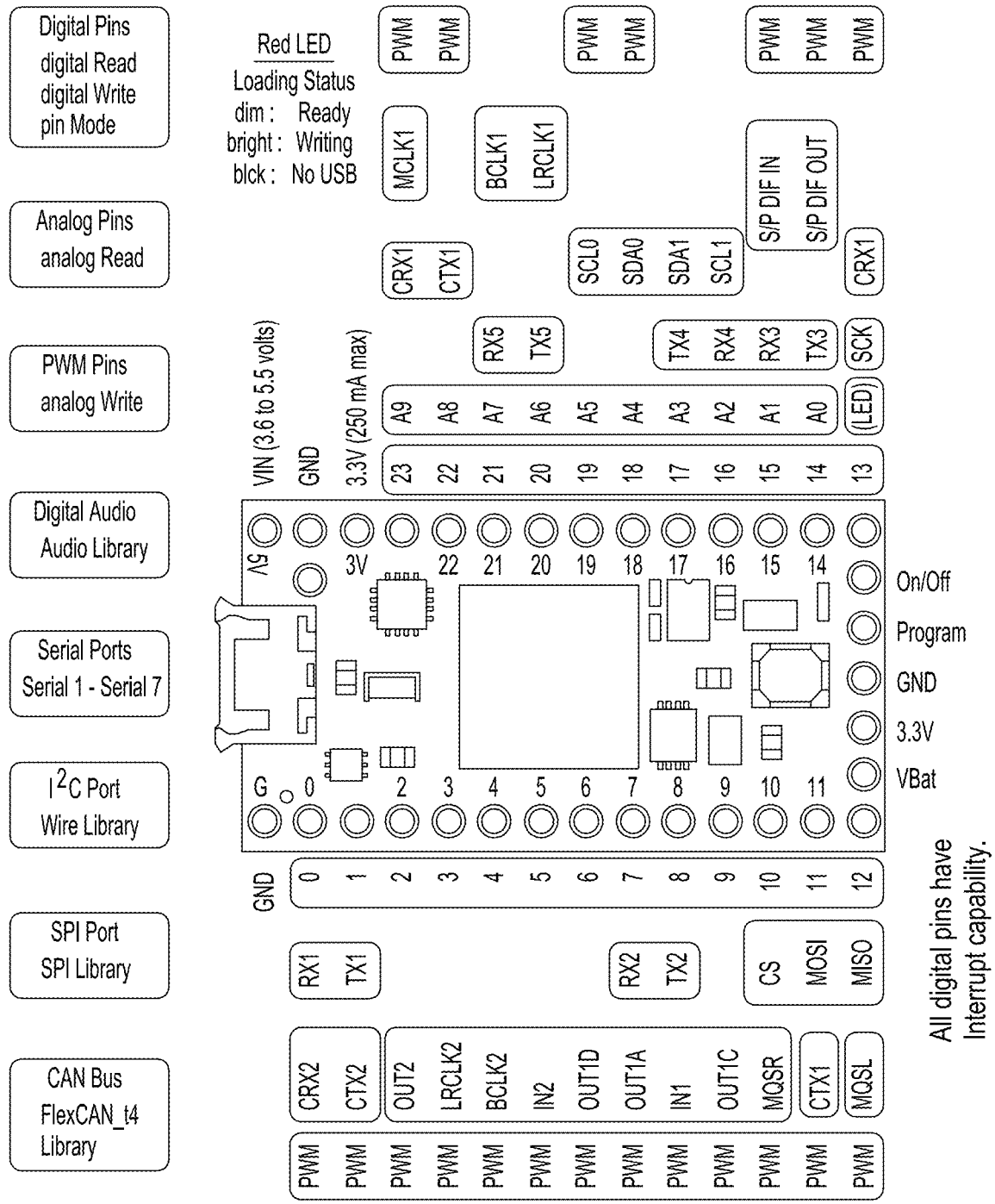
FIG. 16 illustrates a pinout of the teensy 4.0 used as the decoder.

FIG. 15 illustrates the block diagram of the decoder. The decoding system 26 comprises the receiving microprocessor, a Teensy 4.0 (26). This device was chosen because of its high-speed CPU and abundant memory. The Teensy (26) reads the digital signal from the AD790 via pin 21 comparator (24), detects a start-of-frame sequence, and then starts clocking the data into a shift register to be recovered and transmitted to an observing computer. FIG. 16 illustrates the pinout of the Teensy 4.0 used as the decoder 26.

Figure 17:
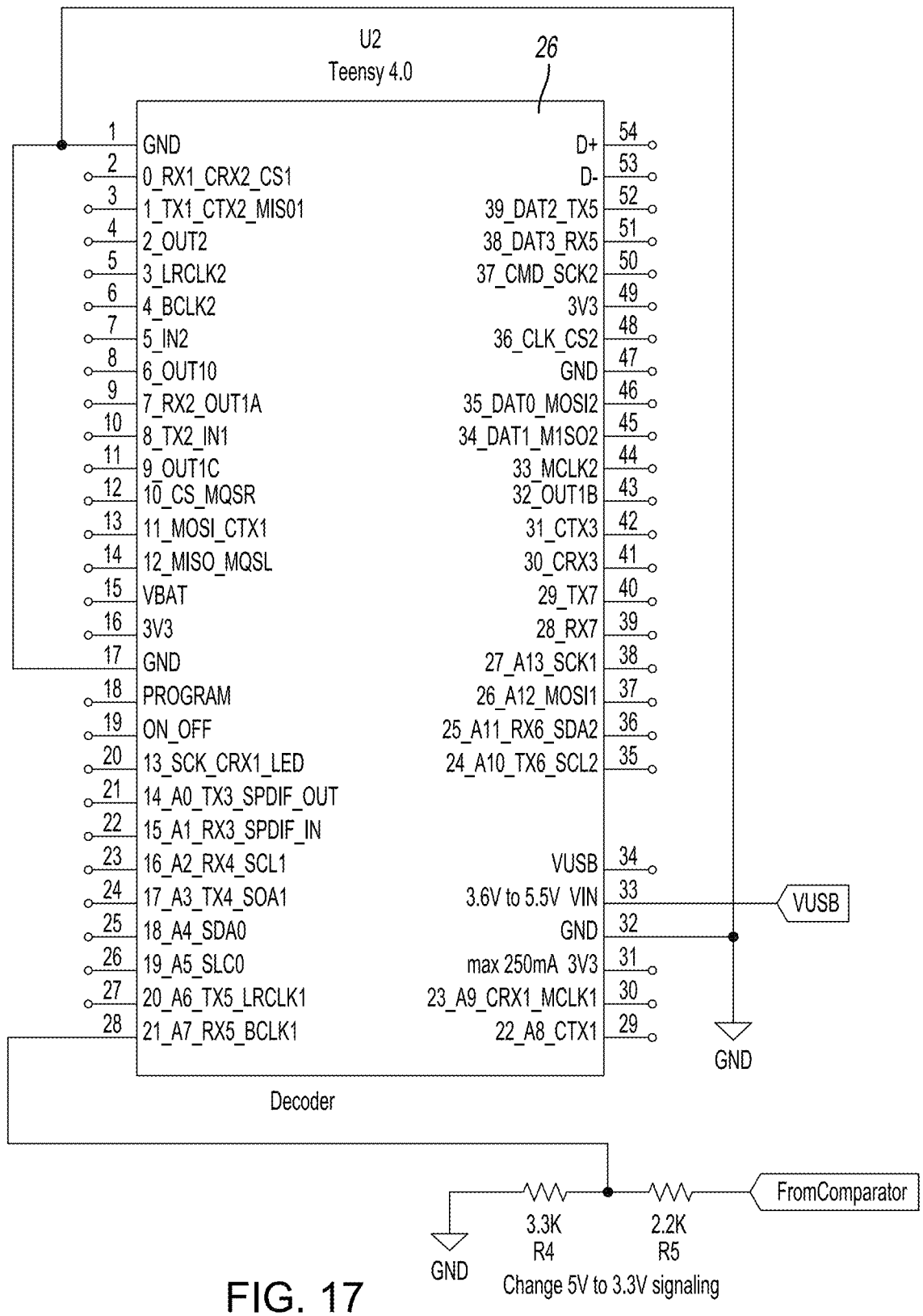
FIG. 17 illustrates a schematic of the decoder section.

The 5V signal from the rest of the logic passes through a voltage divider since the Teensy (26) is 3.3V logic and could otherwise be damaged. Like the other microprocessor used in the gain control system, this one also has an isolated supply to avoid interfering with the visible light communicaiton VLC signal. FIG. 17 illustrates the schematic of the decoder section (26).

Alternatively, the output of the automatic gain control subsystem may be imported directly into the receiving microprocessor's Analog-to-Digital Converter (ADC), specifically to pin 14, for slower but more precise measurement. This feature is used later for the Code Division adaptations.

Communication Protocol Design

A very common initial approach to VLC, and one used in this system as well, is for the designer to use a variant of a simple digital protocol like UART or Manchester encoding to modulate and demodulate the transmitted data. Manchester encoding is even mentioned as an option in the IEEE 802.15.7 standard. This approach has the benefit of masking noise at higher signal amplitudes and works well with a variety of hardware and software decoders. Unfortunately, it was discovered to not be very robust because at low amplitudes the digitizer detects noise in place of the signal. An alternate method also explored in this project is the transformation of the received signal into a bipolar format that makes possible the use of modern techniques from the field of radio frequency transmission (see the output of the ambient light filter in FIG. 7).

Regardless of the exact form of the signal, wireless communication frequently only has a single link between the sending and receiving sides of the wireless connection. (VLC is an exception to this in that it can feature multiple channels through the use of different frequencies of light.) In contrast, a wired connection frequently has more than one wire, allowing the transmitting side to send a clock signal or synchronization pattern through a second channel alongside the data. However, using an additional link for non-data purposes is inefficient, slower, and costs more, so protocols have evolved to allow data to be sent without a clock signal or in a way that one can be recreated on the receiving side from context cues. These are known as asynchronous protocols. They feature independent clocks on each end of the channel so that the receiver reads the contents of the channel at the same time as the sender writes data to it. The clocks can drift out of synchronization in short order, however, so some degree of overhead (though usually less than that needed for a synchronous protocol) is still required. The clocks are typically synchronized by a framing signal, which is named such because it usually "frames" some amount of data. The end result is that asynchronous protocols can use fewer wires or channels than a synchronous one, or that they can use those channels for increased throughput.

As an example, one of the simplest such protocols is the Universal Asynchronous Receiver-Transmitter (UART), which requires both sides to have a shared clock frequency to read the bits being sent at the correct rate and uses rudimentary synchronization in the form of a start bit that prepares the receiver for reception when the line changes from the idle state. The start bit controls the receiver's clock phase and also aligns the received bits. An unsynchronized receiver will eventually drift toward proper synchronization simply because the data being sent will not quite line up with the proper start bit's location. UART is suited mainly to wired serial applications where the signal is strong, however, because it is very sensitive to noise and timing drift. Any noise would, at best, immediately corrupt a bit and has a roughly ten percent chance of disrupting synchronization. As a result, more complex protocols should be used to support VLC.

Manchester Encoding Scheme

The asynchronous Manchester encoding was the first protocol considered for the VLC system 10's transmission method, as it is more robust than UART and was even incorporated into some older VLC standards, such as IEEE 802.15.7. The digital protocol is purposely designed to avoid ambiguity issues during long, repeated bit strings, and does so by encoding each transmitted bit as two alternating logic levels in sequence. A "1" bit would be encoded as logic levels "10" and a "0" bit as "01." This means that there is a level transition that takes place in the middle of each received bit for easier clock recovery and that a long sequence of identical bits still has level transitions, allowing the decoder to accurately count the bits.

Figure 18:
FIG. 18 illustrates a comparison of a direct transmission of "1111 . . . " and the Manchester encoding of the same data, where the latter includes a clocking signal.

FIG. 18 illustrates an example of a direct transmission (upper) of the signal "1111 . . . " vs a Manchester-encoded version (lower) of the same signal. Note how the first transmission blurs together while the second is still distinct. There are more complicated or more efficient encodings, but Manchester requires low amounts of processing and overhead, so it initially appeared to suit the microprocessor-based hardware used for the system.

3.2.1.1 Synchronization and Framing

A complication arises, however, because the transmitted encoding must alternate during each sent bit. If two already-alternating bits are sent (the message is originally "10" or "01"), there is no transition between the two bits once encoded. The decoder must therefore detect not only the level transitions, but the amount of time between them. If the next bit is the same, there is an extra transition before the bit, but if they differ, the next transition takes twice as long but is the next bit. As a result, the protocol requires the decoder to accurately know during startup whether it is seeing an intra-bit or an inter-bit transition, since all following data must rely on that knowledge to detect further bits properly.

Figure 19:
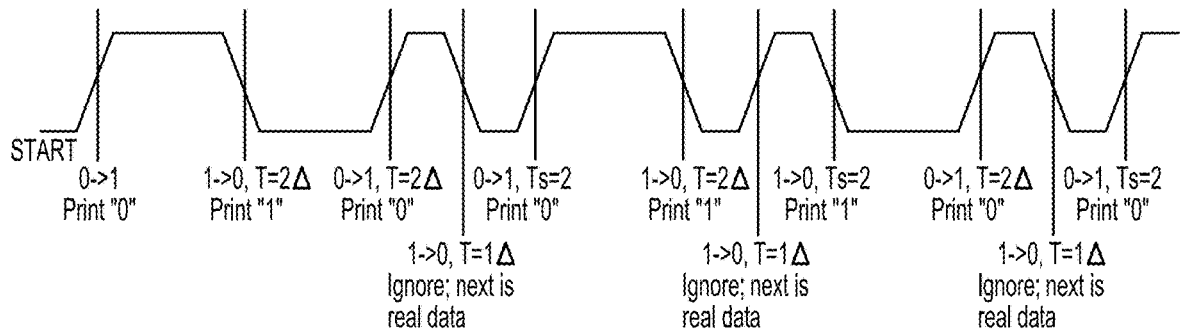
FIG. 19 illustrates a pictorial showing the level interrupts and the time calculations that allow the decoder to interpret their meaning.

FIG. 19 illustrates a pictorial showing the level interrupts (vertical lines) and the time calculations that allow the decoder to interpret their meaning.

In addition, noise on the channel can induce level transitions or transients that are hard to compensate for or detect. A transient signal might soon return to the actual value, but it will have already changed the state of the decoder. If one of these events occurs, or the light signal is occluded, data will be lost, or the decoder may even acquire an additional and incorrect bit in its message. If error detection was used, the message can be marked as invalid, but the decoder still needs to figure out how the incomplete data it has can be resynchronized to the transmitter's information. A partial solution to this problem was to make the decoder only sensitive to light level transitions around the time that the transmitter was expected to send one. In this way, only transitions at the end or middle of a bit were accepted. It still allowed erroneous data through, but only if it occurred near when an actual transition was supposed to happen.

Figure 20:
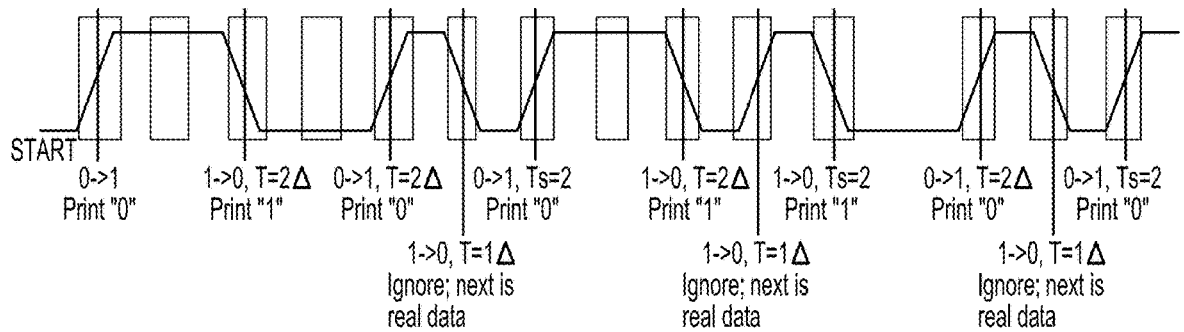
FIG. 20 illustrates a method of reducing interference by limiting the places that the receiver can accept level transitions (not to scale).

FIG. 20 illustrates boxes that represent the times that the decoder can accept level transitions (not to scale). Transitions outside the boxes are ignored, reducing noise.

An alternate solution to the timing window approach might have been to have the decoder activate periodically rather than on each level transition, but the use of a clock instead of using the level triggering negates many of the benefits of using Manchester encoding. A major risk would be timing drift causing the system to miss a level change, and the decoder still may encounter errors if a transient occurs during sampling. In addition, level-triggered techniques are more efficient, since the incoming data can be processed in an interrupt, and the time-triggered approach still does not solve the issue of lost data due to interruptions in the signal.

Figure 21:
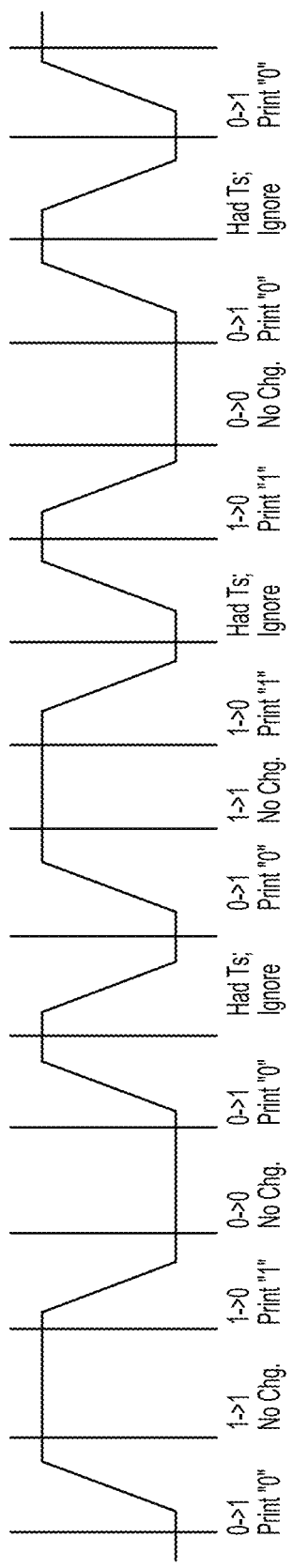
FIG. 21 illustrates how a time-triggered mechanism can read the same bit sequence.

FIG. 21 illustrates a diagram that shows how a time-triggered mechanism might read the same bit sequence. Instead of checking the transitions themselves, it periodically reads the signal level (vertical lines) and computes whether it has changed from the last level seen, which would indicate a bit (but only if two bit-times have passed). However, this method requires more processing power and has a risk of drifting across bit boundaries, resulting in errors.

Figure 23:
FIG. 23 illustrates data sent in an example frame of the Manchester encoding in the VLC system.

A better solution to both problems was the addition of a packet framing sequence (see FIG. 23 for what a framing sequence looks like). Without framing, if the decoder lost a bit due to occlusion, for example, it would still read eight bits into a message byte, but in doing so would now consume a bit from the next message before marking the byte as "complete" (this is partially because the input to the decoder is primarily activated by the level transitions of the Manchester encoding, so it does not notice that the next bit took longer than usual). At this point, the next message would also be missing a bit, causing the problem to repeat indefinitely. This problem can occur to any type of transceiver, not just to one particular encoding technique.

Figure 22:
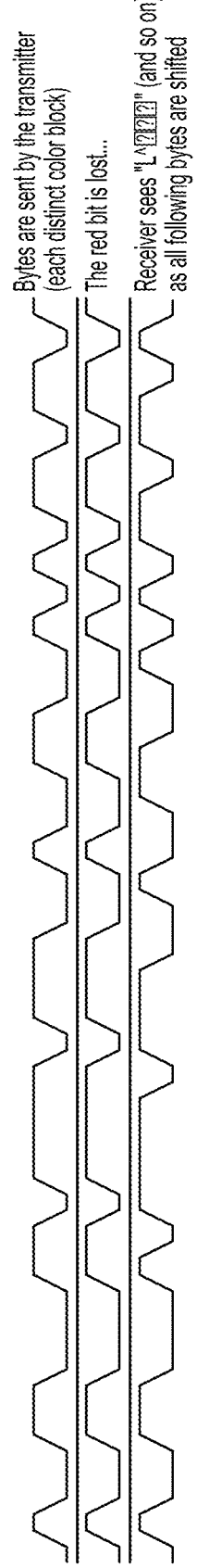
FIG. 22 illustrates a diagram showing how one lost bit can cause a chain reaction that corrupts all following bits in the sent data.

FIG. 22 illustrates a diagram showing how one lost bit can cause a chain reaction that corrupts all following bits in the sent data. The output in quotes is the output of the corrupted data, which comprises invalid characters.

The addition of a framing sequence forces the decoder to resynchronize its message bytes to the ones being transmitted to avoid this sort of ongoing data corruption problem. The receiver will periodically stop and wait before resuming reception when it detects the start-of-frame signal. This ensures that if it gets out of synchronization, the data corruption is blocked from spreading further when the receiver forcibly resynchronizes with the transmitter. Conveniently, this approach may be used alongside one of the other noise-reduction methods mentioned above. Since the code for that had already been written, and worked better with the framing sequence detection methods, the interrupt-driven version was used.

3.2.1.2 Packet Format

The framing method used in the VLC system 10 is to send a short preamble to set the channel to a known state followed by a sequence of eight transitions with timing that would not be easily reproduced by noise. After the preamble and frame, the transmitter sends four bytes' worth of data. This creates a packet where at most four bytes of data can get corrupted by any single noise or transient event before the decoder will halt and wait for a new start signal. A blocked signal (caused by something moving between the sending light source and the receiver) can take longer to resume, as the decoder needs to complete its current message and then start looking for a new start sequence. In rare cases, it could take up to eight bytes of data to resynchronize if the new start sequence arrived during the period in which the light was blocked. However, while fewer bytes would be lost in a corruption event if only one byte were sent per frame, the framing sequence is approximately one and a half times the length of a byte, so the data-to-overhead ratio is greatly improved when sending multiple bytes.

FIG. 23 illustrates the data sent in one frame of the Manchester encoding in the VLC system 10. It features four bytes of data, noted in alternating blue and green. The red portion is the start-of-frame signal.

Code Division Encoding Scheme

The Manchester coding scheme previously discussed was quite feasible, but synchronization was difficult to achieve. At long ranges, or with more than a small amount of noise present, the framing sequences themselves could get corrupted, causing the receiver to drop the entire frame, and the system began having trouble resynchronizing in general since every time a frame was corrupted via an off-by-one error it would also fail to find the next frame. Additionally, the signal was nearly imperceptible at fifty feet, and the tuning of the hardware to detect this started to break down at this distance. As a result of these discoveries, the VLC system 10 was modified to use a code-division algorithm in hopes of improved range or error-resistance, but at the cost of the data rate. A small amount of error detection was also added to the system to reduce corrupted data after some was observed in the output of the decoder during the Manchester attempts.

Code Division was predominantly developed for mobile phones to allow multiple handsets to talk to a base station. The protocol is largely immune to noise since it selectively amplifies only the actual signal intended for that receiver. As a side effect, it is also highly immune to interference from other transmitters, which is what allows the mobile phones to ignore communications from the other phones in the network.

The original protocol encodes data either on top of mutually orthogonal vectors (called "chips") or as a stream of pseudorandom bits. The decoder then correlates the historical patterns of the received data with its vector or with the pseudo-random seed shared with the transmitter. If the chip is not yet fully received or if it is intended for a different receiver, there is no correlation. However, once the chip finishes arriving, it aligns with the receiver's copy and produces a strong signal indicating that a bit has arrived and what its value is. This solves the bit synchronization problem since the decoder can now identify with certainty if and when it is seeing a bit, and it also reduces the influence of other transmissions on the channel. Noise is reduced as well, since it will only corrupt a small portion of the signal even as the rest remains highly correlated.

Table 3 shows how different chip sequences (the top two rows of each block) do not correlate (the third row and result), or how even the same chip sequence will not correlate if it does not perfectly align.

The Code Division protocol ordinarily requires a bipolar signal, where the bits of the chips are represented as 1 and −1 with an average signal level of 0, but the transmitter for this system emits only 0 and 1 logic levels. However, the receiving hardware converts the original digital signal into a bipolar signal in the process of filtering ambient light (see FIG. 7). The resulting bipolar signal may now be used for Code Division, since the transmitter's 0s become −1 levels in the process of the conversion. The decoder can detect the presence of both the 1 and −1 signals over the channel average of 0, allowing the use of Code Division and also signaling whether the channel is actually in use (all signals would be 0 if it were idle). The bipolar signal differs in another important way from a regular binary signal as well. When another device is transmitting, the −1 and 1 bits add a level of random noise, but it does not actually interfere with the reception of the chosen transmitter. If this were a binary encoding, 0 and 1 bits sent at the same time would add together to form 1 bits, resulting in an incorrect message.

FIG. 24 illustrates the difference between a digital and a bipolar signal can be seen. Both signals are affected by a positive interference spike (vertical bounding lines, representing another transmitter sending a 1), but the digital signal (upper) is subtly corrupted, while the bipolar signal (lower) is detectably incorrect. A bipolar detector can detect the ground state (horizontal dark lines) as well as the excited states of the line, whereas a digital version only detects that the signal is non-zero.

The system samples each bit of the chip sequence twice, but one of the samples is effectively discarded as the double-sampling is only used to passively keep the decoder in phase with the transmitter's signal. As a result, the ability to detect the chip sequences is limited to what is essentially a majority voting operation, which limits the operating range from what is possible with this technique. Even so, the code-division VLC decoder has improved performance (a gain in range of up to twenty feet was observed) and synchronization over the Manchester design.

FIG. 25 illustrates the double sampling of the decoder. The green lines (here, the even samples) were in-phase with the signal and will be kept for use in decoding the signal. The blue lines (odd samples) overlapped with the bit transitions and thus may be inaccurate, so they will be discarded.

The decoder does not initially know the alignment of the samples, so it must sample twice as frequently so that at least one of the sets will be in-phase.

3.2.2.1 Synchronization and Framing

Because VLC system 10 is a system, the multiple access functionality of Code Division was less immediately important than the ability to filter noise and improve synchronization. To that effect, in some embodiments, VLC system 10 used three different chips for data transmission for improved separation of the potential data being sent. The three chips were eight bits in length each, with four bits of each logic level for a constant average signal level. One chip signified a 1-bit, a second signified a 0-bit, and a third, the starting or S-chip, was used for framing the data being sent. Unlike in the Manchester design, the decoder does not need priming to detect bits properly, since the chips arrive at a known rate and are instantly discernable once they have arrived. Either or both factors can be used to verify the accuracy of the current chip. However, the reassembly of the bits into readable data still requires framing to convert the received bitstream into a sequence of bytes. If a chip were to be lost, the same off-by-one issue as seen in the Manchester decoder could corrupt all following data.

FIG. 26 illustrates the three chip sequences used in the Code Division version of the VLC system 10. The upper sequence is the start sequence, the middle version is a 0, and the lower version is a 1.

The VLC system 10 recognizes a chip if more than six bits of the chip match with either a 1- or 0-bit during the receive state or a start chip if it is synchronizing. To facilitate synchronization, both timing and correlation are used to detect the presence of a chip. Only both together will confirm that one has arrived. The decoder continually scans for the start chip during the acquisition stage. Once the start chip is detected, the decoder knows that the following data chips are going to finish arriving at fixed times (offset from when it sees the complete S-chip) and thus only performs the correlation operation once the chip has finished arriving, rather than every time a bit of the chip is received.

3.2.2.2 Packet Format

After the start sequence there are eight data chips, one for each bit of the byte being transmitted. There is also an even-parity code sent after the data chips, intended to reduce invalid data that makes it through the Code Division or that results from a dropped connection due to an obstructed light beam. This is sent as an additional 1- or 0-chip after the data chips, for a total of 10 bytes sent per real byte of data. Again, the intended advantage of this technology is for improved resilience and range, but it reduces the available speed for any single receiver device, which is a classic tradeoff in channel design.

FIG. 27 illustrates an example character encoded via the Code Division protocol. The red chip is the start signal, the blue chips are 0-valued, and the green chips represent 1. The last item in purple is a parity chip also with the value of 1.

Software Design

The original design specification of the VLC system 10 included a queue for preparing signals to be sent over the VLC link, but it was removed early on. It proved easier for testing to use a fixed message programmed into the transmitter since the fixed message was easy to check for data errors. An additional benefit was that the transmitter now operated in a standalone format and did not need an attached PC. The software was written in C++ in the Teensyduino environment and used timer (and pin, in the case of the Manchester design) interrupts to activate in response to events.

Encoding

The encoding system was built on a Teensy 4 processor that would control the state of a digital GPIO pin to turn the headlamp on and off. A state machine was implemented that would perform the pin state changes in order to create the desired signal. State transitions were triggered by a timer register exceeding a set bound, which triggered a function in the regular code outside of the interrupt. The timer continued to increment even while the regular code operated, ensuring that there would be no timer drift.

3.3.1.1 Manchester Transmitter

A selected ASCII character sequence was chosen as the data to be sent. For the Manchester system, this was four bytes to fit the frame size being used (see FIG. 23). The state machine for the transmitter was segregated into two parts. Both parts operated similarly, in that they would trigger after a specific time, but the first part would invert the pin state after a set list of delay times to form the start-of-frame signal and the second operated on fixed times and set the pin state based on the value of the bit in the sequence to be sent. In the second mode, the first value set was the actual state of the bit and then, half of the overall bit time later, the inverse of the bit would be sent to form the Manchester code for that bit's value.

Figure 28:
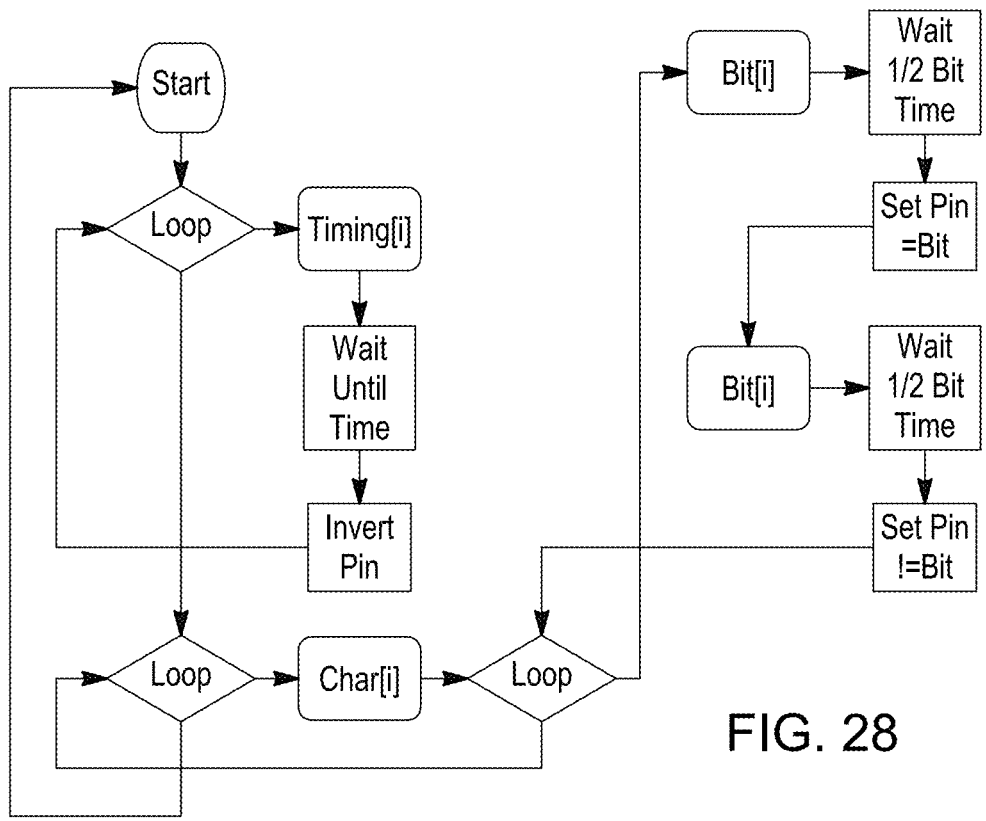
FIG. 28 illustrates a flowchart of the Manchester encoding transmitter software.

FIG. 28 illustrates a flowchart of the Manchester Encoding Transmitter code.

3.3.1.2 Code Division Transmitter

The Code Division transmitter was more complex than the Manchester version. The Code Division system had three sections to its state machine, and rather than output the value of the bit (or the inverse of the bit), it had to index into and then send voltage levels corresponding to the bits inside the associated chip sequences. The three states, in order, sent the start sequence, sent the eight sequences associated to the bits of the byte being sent, and sent the parity sequence associated to the odd parity of the byte computed via XOR. The bit time for the Code Division system was actually slightly larger than that of the Manchester system, both because of the larger chip compared to the simpler Manchester sequence but also because the decoder was more complex and could only process data so quickly.

Figure 29:
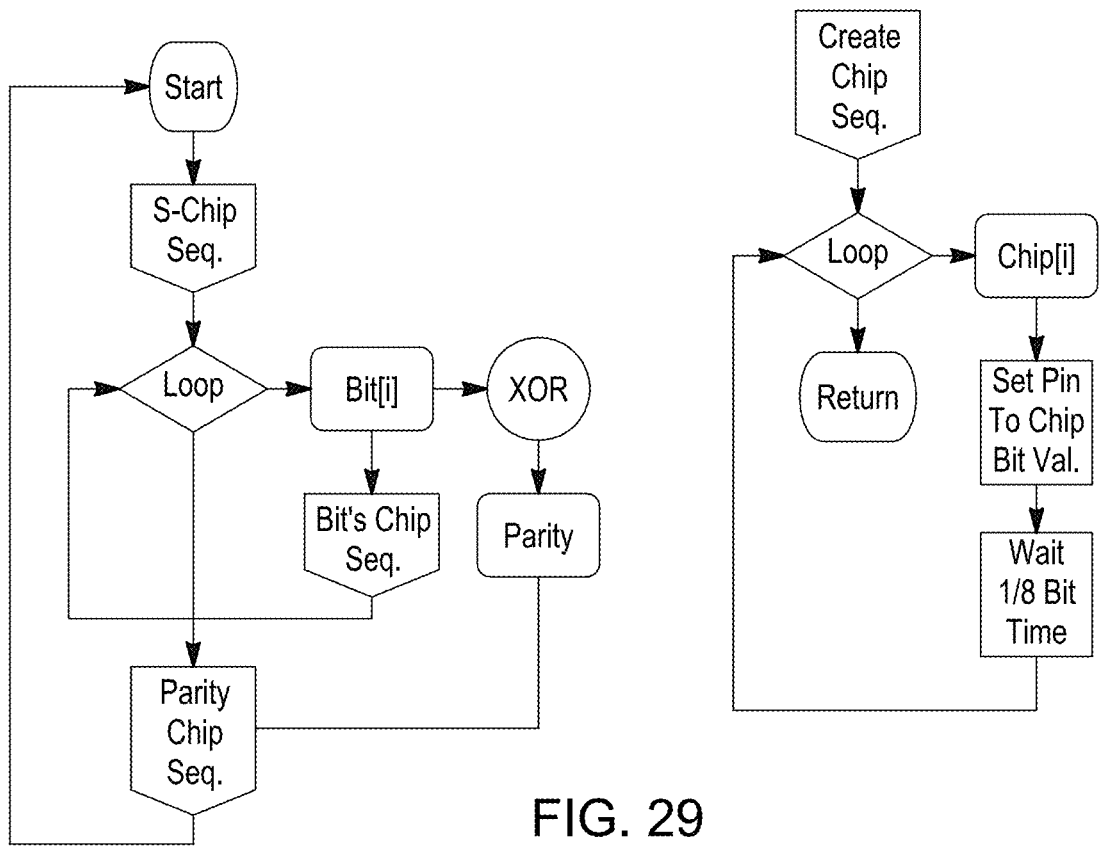
FIG. 29 illustrates a flowchart for the Code Division transmitter's software.

FIG. 29 illustrates a flowchart for the Code Division Transmitter's software.

Decoding

Both decoders were far more complex than the transmitter code. Where the transmitter had to simply step through bits, the decoders had to continually sanity-check the incoming signal without the benefit of a real clock input or even a firm digital signal (in the case of the Code Division design). Signal lock-on was acquired through continually testing the incoming signal to see if it adhered to a known pattern, at which case the mode would switch to reading the actual data. This was how the decoder handled the framing of the sent data. If the signal it was detecting did not match with the start signal, it would wait idly until the start sequence was detected and it could resynchronize. This was especially important in the case of the Manchester decoder, where unexpected noise in the signal could cause a perceived bit to take an unpredictable amount of time, resulting in a loss of alignment with the sent information.

3.3.2.1 Manchester Decoder

The Manchester Decoder software contained the twin of the transmitter's framing sequence in its own memory. Every time the pin interrupt occurred, it would save the system time that it happened. The background task would then compare the time interval between the interrupt and the previous one to determine if the time delay matched that of the start sequence. If it did, the state machine would advance one stage. If the time no longer matched, it would reset to the beginning. Once the state machine had read the entire framing sequence (minus a quick high-low transition to reset the channel, only present in the transmitter's sequence), the decoder switched modes to read the following data bits.

Figure 30:
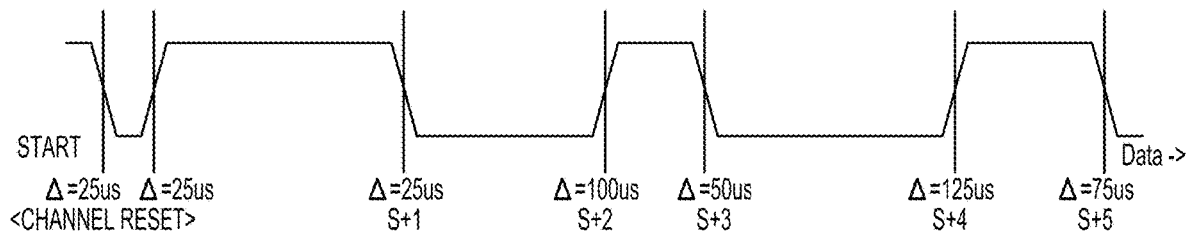
FIG. 30 illustrates how the decoder's state machine detects and interprets the timing of the start sequence.

FIG. 30 illustrates how the decoder's state machine detects and interprets the timing of the start sequence. The green lines (vertical) represent the level interrupts, and the decoder measures both their direction and the time since the previous one to determine their validity. If both match the stored values, the state advances until the start sequence is complete and data can be sent.

It was here that the design got slightly complicated. In the event of a repeated bit, the signal would transition after the end of the bit. This resulted in an extra transition which had to be discarded. However, if the bits had alternating values, the next transition would be in the middle of the next bit, which had to be kept. To handle this properly, the decoder continued to log the time at which the bit transition had occurred. If it took two half-bit-times, it was a new bit. But if it took one half-bit-time, it was the inter-bit transition, and the next transition could be expected to be the real bit (see FIG. 19). Either way, once the bit was detected, the direction of the interrupt (rising or falling) was used to determine the value of the bit. A falling edge was a 1 (a 1→0 sequence; since it started with a 1, it represented a 1), and a rising edge was a zero (a 0→1 sequence). Every eight bits (a value additionally reset by the arrival of a new frame, to ensure alignment of the bits in each byte with those being sent), the collected bits were shifted into a byte and sent to the attached PC to be validated.

Figure 31:
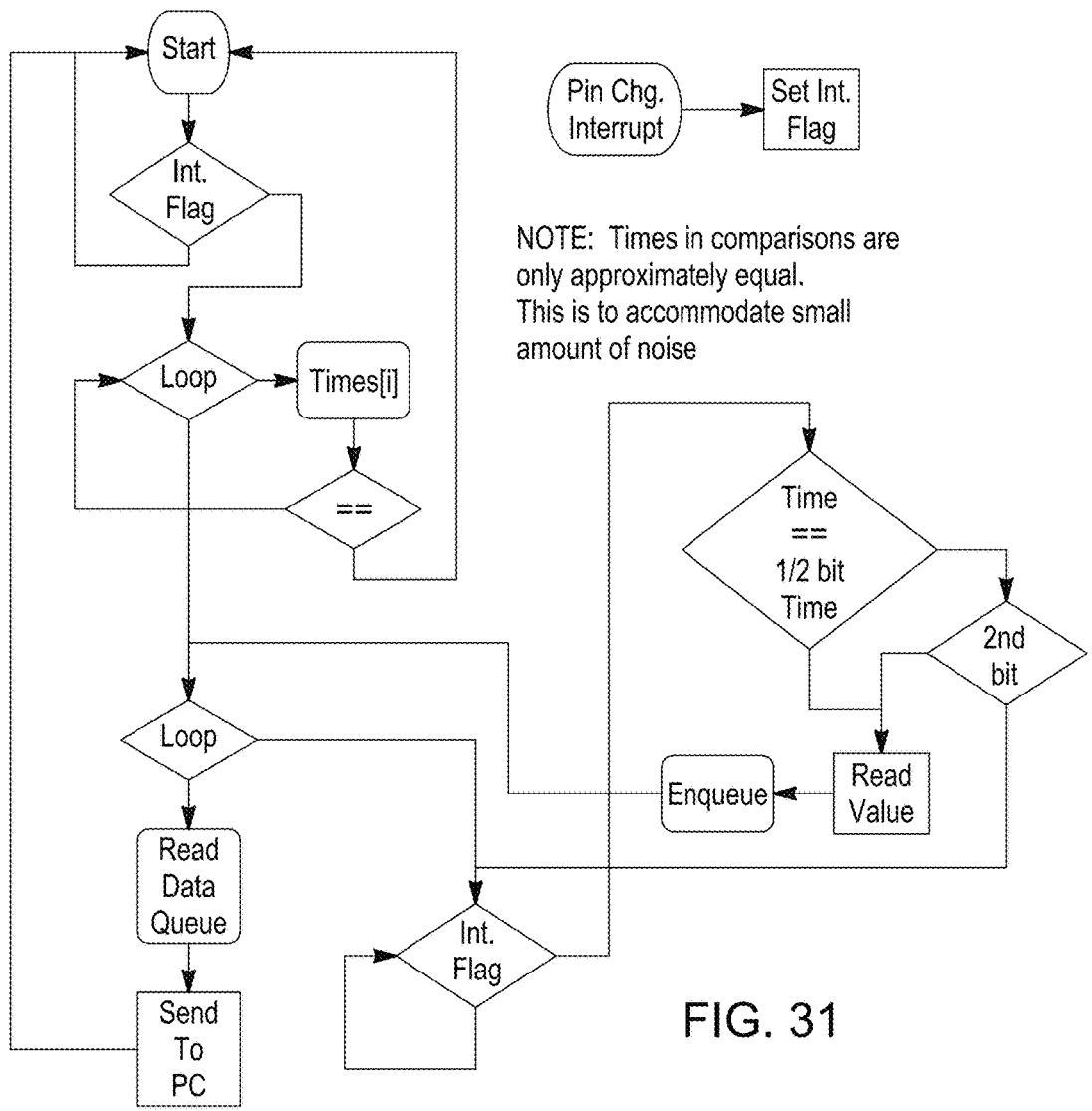
FIG. 31 illustrates the Manchester decoder software's flowchart.

FIG. 31 illustrates a flowchart of the Manchester Decoder Software.

3.3.2.2 Code Division Decoder

The Code Division decoder went entirely into a time-triggered design after the experience with uncertain or inaccurate bit-times in the Manchester model. Since there was no external synchronization source even here, alignment with at least some phase of the transmitter's output was ensured by sampling the analog value of the signal at twice the fastest rate that bits could change in the incoming data stream. Each sample corresponding to the same phase in the incoming stream was inserted into a different queue. For convenience, these will be referred to as even and odd samples. Every two samples during the acquisition phase, the decoder will compare the values of the samples with the steady-state level of the channel (taken as a long-term exponential average for this system; the chip sequences were all designed to have an average level of 0 since there were an equal number of +1 and −1 levels in each) to create the +1 and −1 readings of this slice of the queue. The +1 and −1 levels are then correlated with the desired chip sequence to detect a hit.

Figures 32, 33:
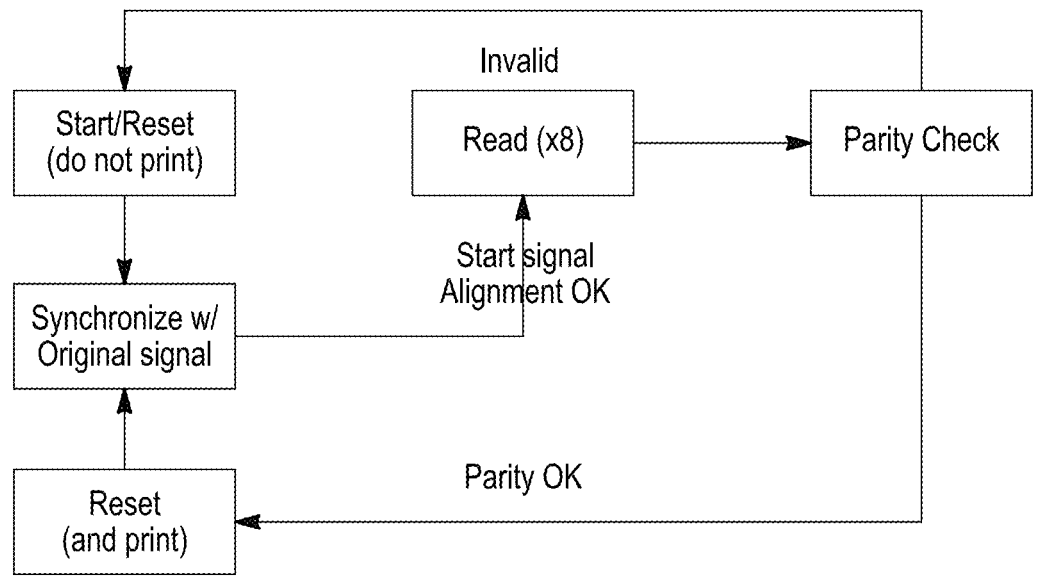
FIG. 32 illustrates the arrival of the start chip and how the detector can "lock on" to its exact arrival time by checking the correlation of the arrival queue with the known chip sequence's value.
FIG. 33 illustrates a decoder's state diagram.

FIG. 32 illustrates the arrival of the start chip and how the detector can "lock on" to its exact arrival time by checking the correlation of the arrival queue with the known chip sequence's value. The detector thus finds both the start sequence and the exact time it arrives.

FIG. 33 illustrates a diagram of the Decoder's State.

Once one of the queues aligns with the start chip, the decoder will use that phase of the clock (for this example, the even phase—see FIG. 25) to read in the next set of chips that represent the byte being transmitted. For eight chips it will read in the signal, perform the correlation to find the most likely bit value, and then shift the bits into a holding register to be prepared for transmission to the validating PC (see FIG. 33). After those eight chips, it performs one last receive-and-correlate to get one more bit. This bit is compared with the parity of the received byte to determine accuracy. If they match, the byte is sent to the PC. For a reminder of the format, see FIG. 27.

Figure 34:
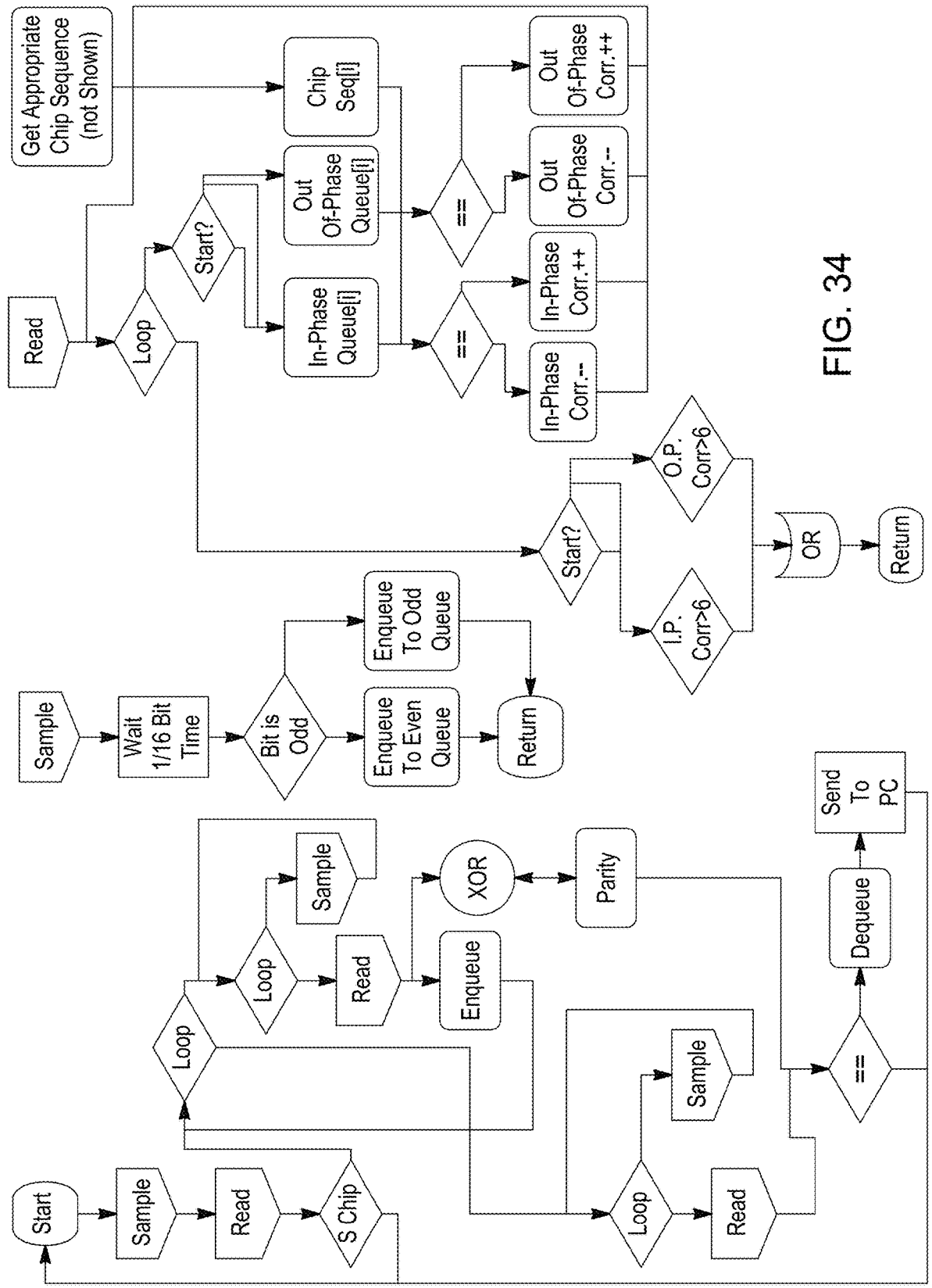
FIG. 34 illustrates a flowchart for the Code Division decoder's software design.

FIG. 34 illustrates a flowchart for the Code Division Decoder's Software Design.

Testing

Some of the preliminary versions of this system were tested indoors in the Institute for Advanced Vehicle Systems (IAVS) at the University of Michigan-Dearborn, a very large building that is brightly lit by both natural and artificial sources. This provided a great environment for testing the system's vulnerability to interference.

Figure 35:
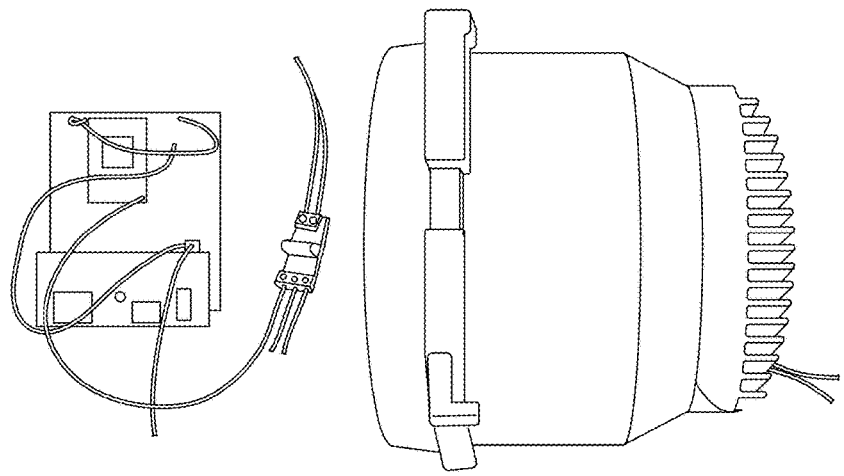
FIG. 35 illustrates the VLC transmitter used throughout the testing of the system.

FIG. 35 illustrates a VLC Transmitter Used Throughout the Testing of the System

Figure 36:
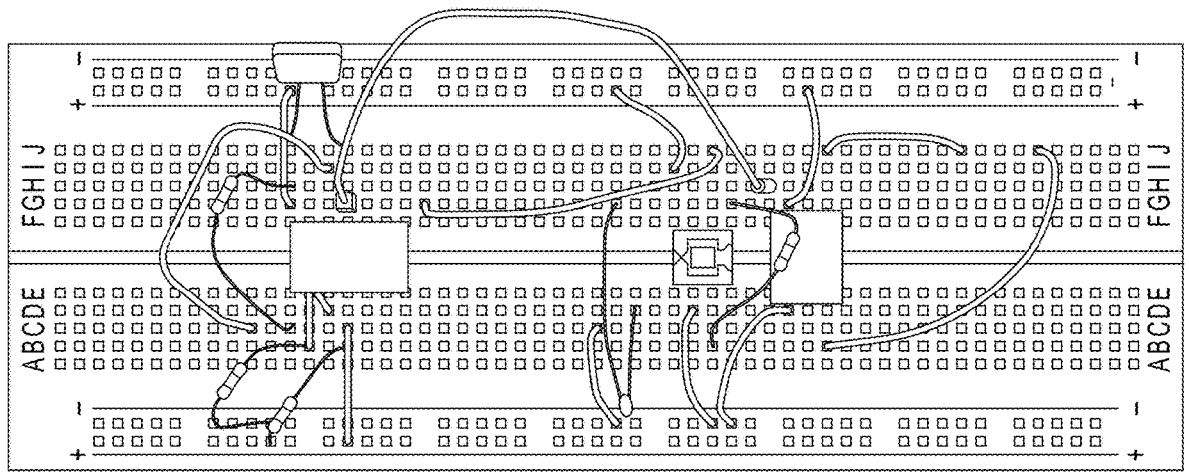
FIG. 36 illustrates the earliest system built.

FIG. 36 illustrates an early system build.

The first system was based around an Arduino Nano at 16 MHz and used UART as its protocol. This was the system that showed the issues with using UART over a noisy channel, as it was very difficult to get it to sync up properly. In addition, the photodetector used was not very sensitive and the components did not respond quickly. In dark conditions, it would easily receive too little light and fail to respond. Too much light was also a problem, but it did achieve a range of 11.5 feet during moderately lit conditions.

Figure 37:
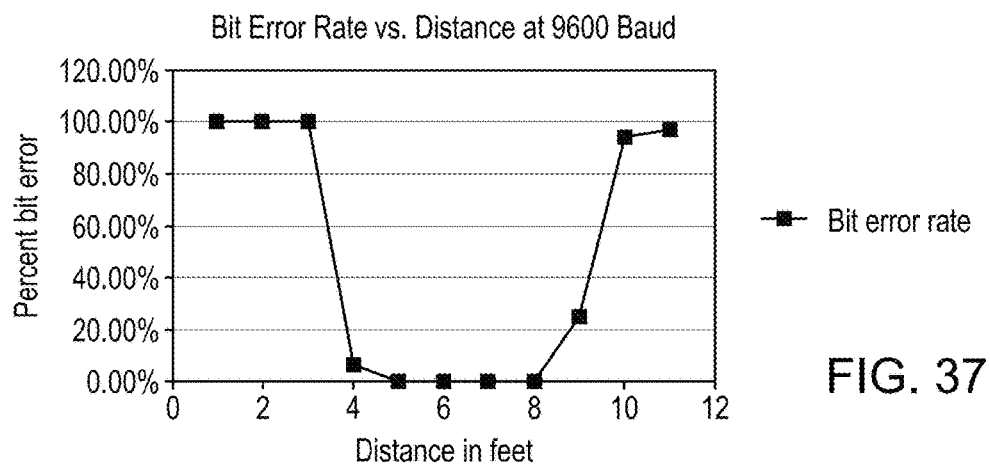
FIG. 37 illustrates bit error rate vs. distance (measurements taken at night with first system).

FIG. 37 illustrates a graph showing bit error rate vs. Distance (measurements taken at night with first system).

Figure 38:
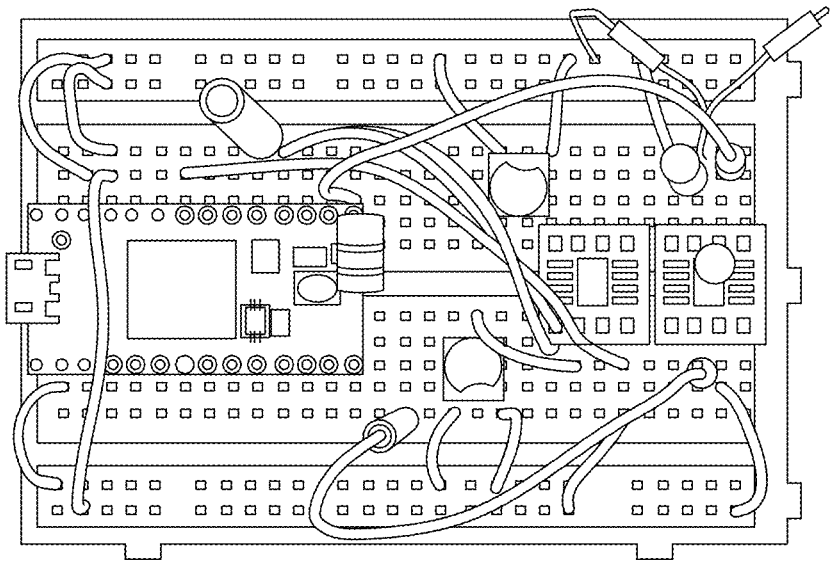
FIG. 38 illustrates the second system built and tested.

FIG. 38 illustrates the second system built and tested.

The next iteration of the design featured a much more sensitive photodetector from Marktech (the same one used all the way to the current model) and a new transimpedance amplifier rather than the all-in-one solution used in the first design. This proved to be much more sensitive and was capable of higher data rates. It also was where the Teensy 4.0 appeared as the microprocessor of choice for encoding and decoding the signal. However, an inadvertent step backward was made when it was decided to use a new digitizer that needed two potentiometers. It required manual tuning to adjust for changing light levels, and the range was a bit low, despite some improvement.

Figure 39:
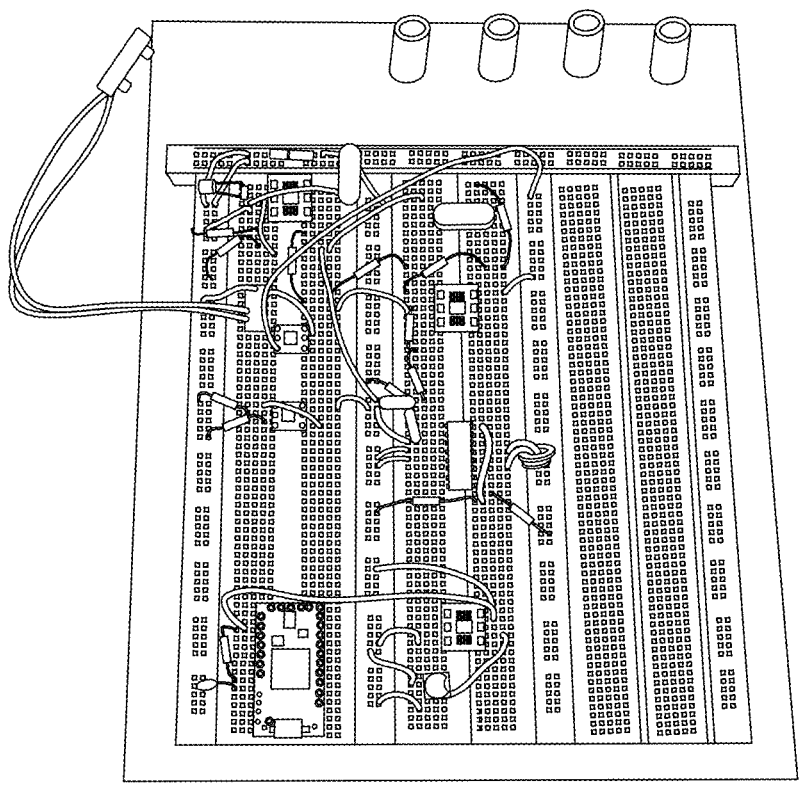
FIG. 39 illustrates the third iteration of the VLC receiver design.

FIG. 39 illustrates the third system of the VLC receiver, and the last to be built on a solderless prototyping board.

The third version was redesigned to again feature automatic ambient light removal, and attempts were made to add a second amplifier that would increase gain as needed for detection of even very weak signals.

Figure 40:
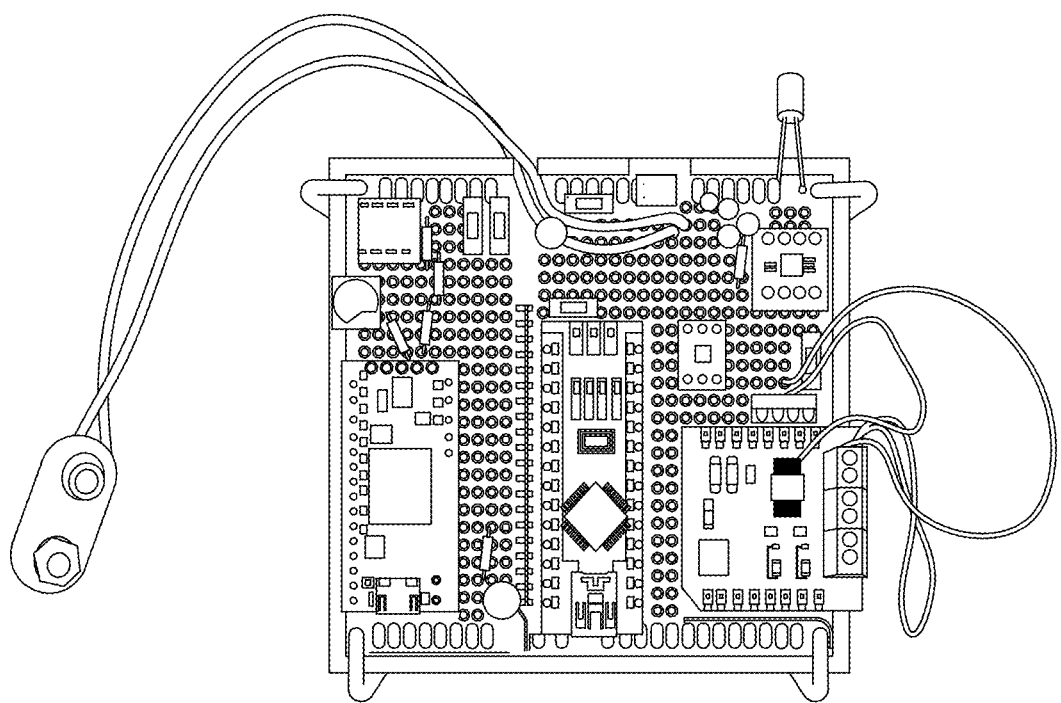
FIG. 40 illustrates the final system receiver.

FIG. 40 illustrates the final system receiver.

In some embodiments, a digitally controlled second amplifier was used to stop an oscillation issue in the amplifier's feedback circuit. This proved successful, although the range was slightly worse than that of the previous generation. The final version drew upon all the knowledge gained in the previous generations and worked without adjustment in all light levels.

Testing for the last two systems was performed outdoors both in bright sunlight (noon) and at night to explore the impact of extreme light conditions. This was done because other designs have historically had difficulties with operating with ambient light or bright daylight.

Figure 41:
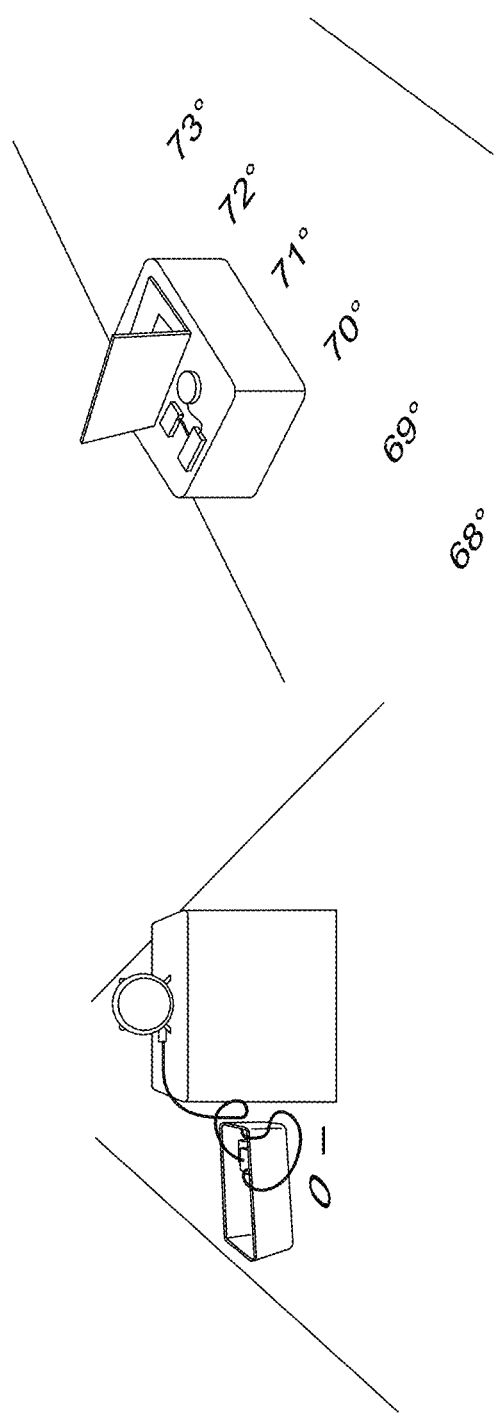
FIG. 41 illustrates outdoor testing of the VLC system in daylight.

FIG. 41 illustrates the outdoor testing of the VLC System in daylight (transmitter, left; receiver, right).

The ambient light filtering worked as designed, and a minor increase in performance was observed during the day tests. The system's range functioned between zero and seventy feet before total signal loss was observed. The test entailed moving the system in a straight line away from the transmitting headlamp in distances of five feet before checking the data arriving from the receiver module. Once signal loss was observed, the receiver's position was fine-tuned in distances of one foot to find both the exact location of signal loss and the first location that errors started appearing.

Figure 42:
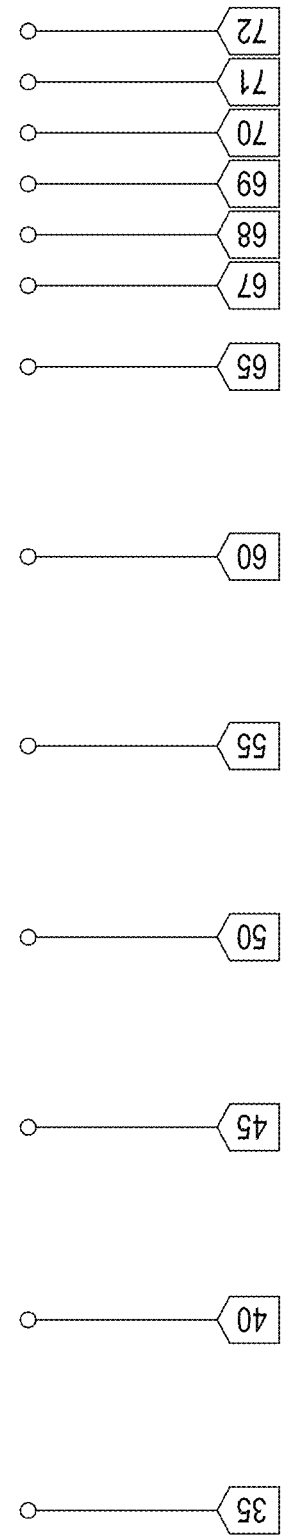
FIG. 42 illustrates how measurements were performed in a case where the signal was lost at 70 feet.

FIG. 42 illustrates of how measurements were performed, in a case where the signal was lost at 70 feet.

Each test was performed twice, on two different days with similar conditions (weather, time, and location), and the exact range was carefully checked multiple times per test to be sure that the limits were accurate. The distance at which near-total signal loss occurred with the code-division receiver was seventy feet during the day, but the signal contained few errors until it passed sixty-six feet (sixty-four and sixty-one feet at night, respectively). At this point errors began occurring at a rate of one error every 20-40 bits on average where before there had been almost none. Manchester was observed to remain almost perfectly error-free up to fifty feet, but it abruptly failed to receive at all at fifty-two feet under daylight conditions. During the night the Manchester receiver failed at fifty feet while working perfectly at forty-eight feet.

Table 4 illustrates average distances of testing results.

Ambient light levels during the daylight testing averaged 135,000 lux, with 52,000 at the sensor. Night testing verified an ambient light level of 0 lux. During the night testing, it was dark enough to measure the light levels from the headlamp. At fifty feet from the transmitter, its power level was 33 lux. At sixty feet, that signal had decreased in intensity to 16 lux.

Figure 43:
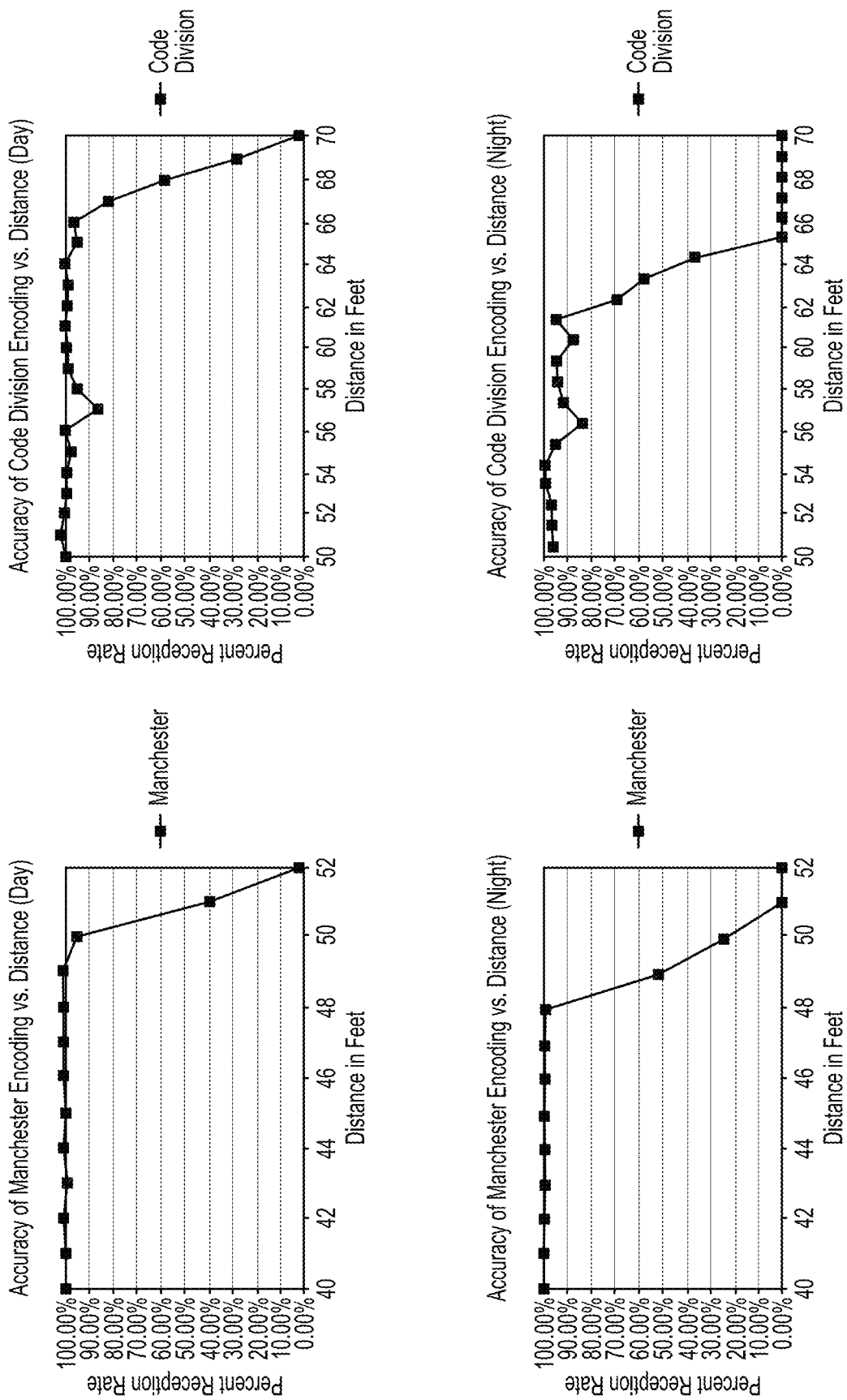
FIG. 43 illustrates a comparison of Manchester and Code Division encoding error rates until loss of signal.

FIG. 43 illustrates a comparison of Manchester and Code Division encoding error rates until loss of signal.

Another important metric of testing was the data rate of the overall system. As mentioned earlier, an ongoing problem with the system was in getting sufficient speed out of the decoder. Manchester, with its low overhead and interrupt-triggered design, was able to achieve 920 bytes per second, or 7360 bits per second. This was from a channel rate of 20,000 transitions per second. The Code Division system had a much greater degree of overhead in the decoder and redundancy in the signal to obtain its range increase, and was therefore capable of 313 bytes per second, or 2504 bits per second, with a base channel transition rate of 12500 transitions per second.

Figure 44:
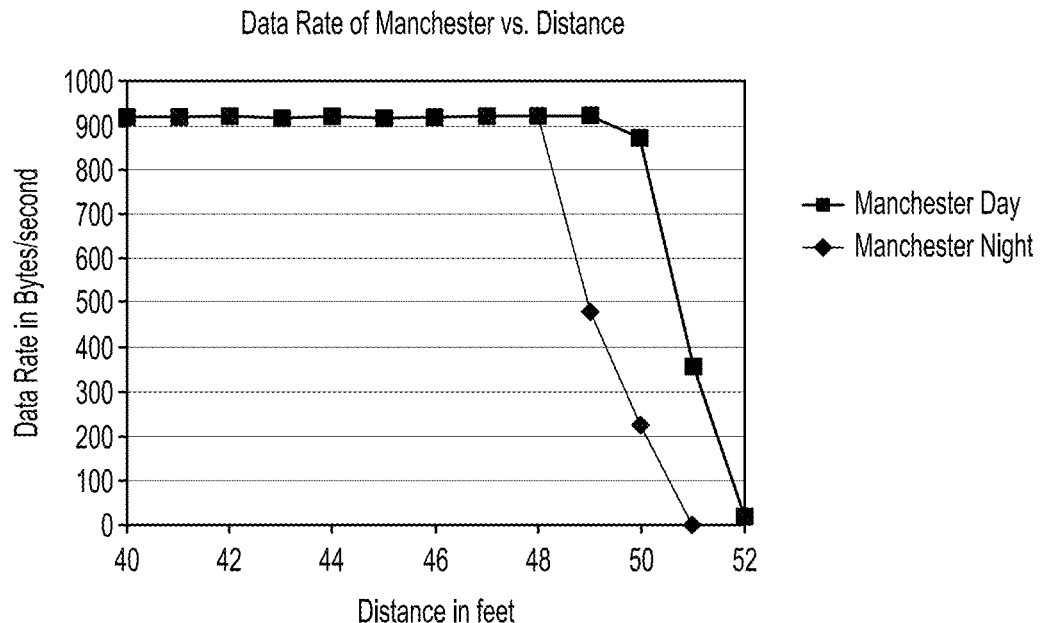
FIG. 44 illustrates effective data rates of the system using Manchester encoding.
Figure 45:
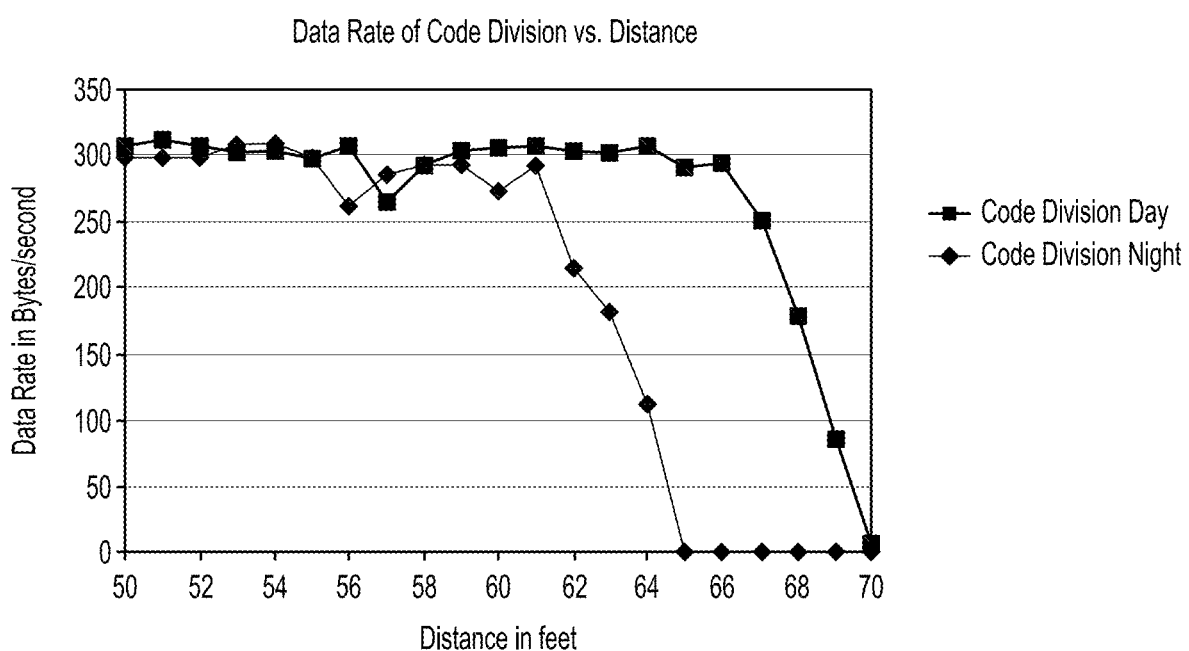
FIG. 45 illustrates effective data rates of the system using Code Division encoding.

FIG. 44 illustrates effective data rates of the VLC system 10 using Manchester encoding. FIG. 45 illustrates effective data rates of the VLC system 10 using Code Division encoding.

Envisioned Modifications

The primary limitation on data rates in the VLC system 10 was not in the analog frontend or even the digitization hardware, but instead was limited by the rate at which data could be processed in the decoder before it would not have enough time to process data and start falling behind the transmitter. The reason that the decoder had problems keeping up with the transmitter was because it needed to process the incoming data, recreate the clock signal or otherwise count and detect bits, and then output the data it had processed. The transmitter, meanwhile, was a state machine that strobed the headlamp in the appropriate pattern, but it did not require any large degree of processing to do so, instead mainly being a sequence of bit operations and conditional statements. Fortunately, this is not an insurmountable problem. The decoder software is highly parallel and would benefit greatly from implementation in programmable hardware like a Field-Programmable Gate Array (FPGA) or an ASIC, especially in the case of the Code Division system. An FPGA is a set of predefined logic elements that can be connected in arbitrary order to create custom digital logic circuits, albeit at a cost in speed due to the configurable connections' delay. It would be preferable to an ASIC while changes to the system are still being made because the FPGA, while slower, can be reprogrammed if there is a problem in the design. An ASIC, on the other hand, has to be designed and fabricated like any other microchip, which requires a great deal of lead time and expense even if the system were to work on the first try. However, due to the marked contrast between the architecture of the microprocessor code and that required to design an FPGA version, the responsibility of that part of the design was given to a researcher with more experience with FPGAs.

Once the speed of the data transmission is increased, it is also possible to adjust the high-pass filter used for ambient light removal so that it removes low-frequency interference signals as well. An example of this operation is shown below, but it could not be fully implemented in the system because there was enough side-band attenuation on desired signals that the range was reduced. With a greater distance between the frequency ranges of the transmitter and the common low-frequency noise sources, there is potential that the filter could be fully applied to block AC line noise and other potential sources of interference.

Figure 46:
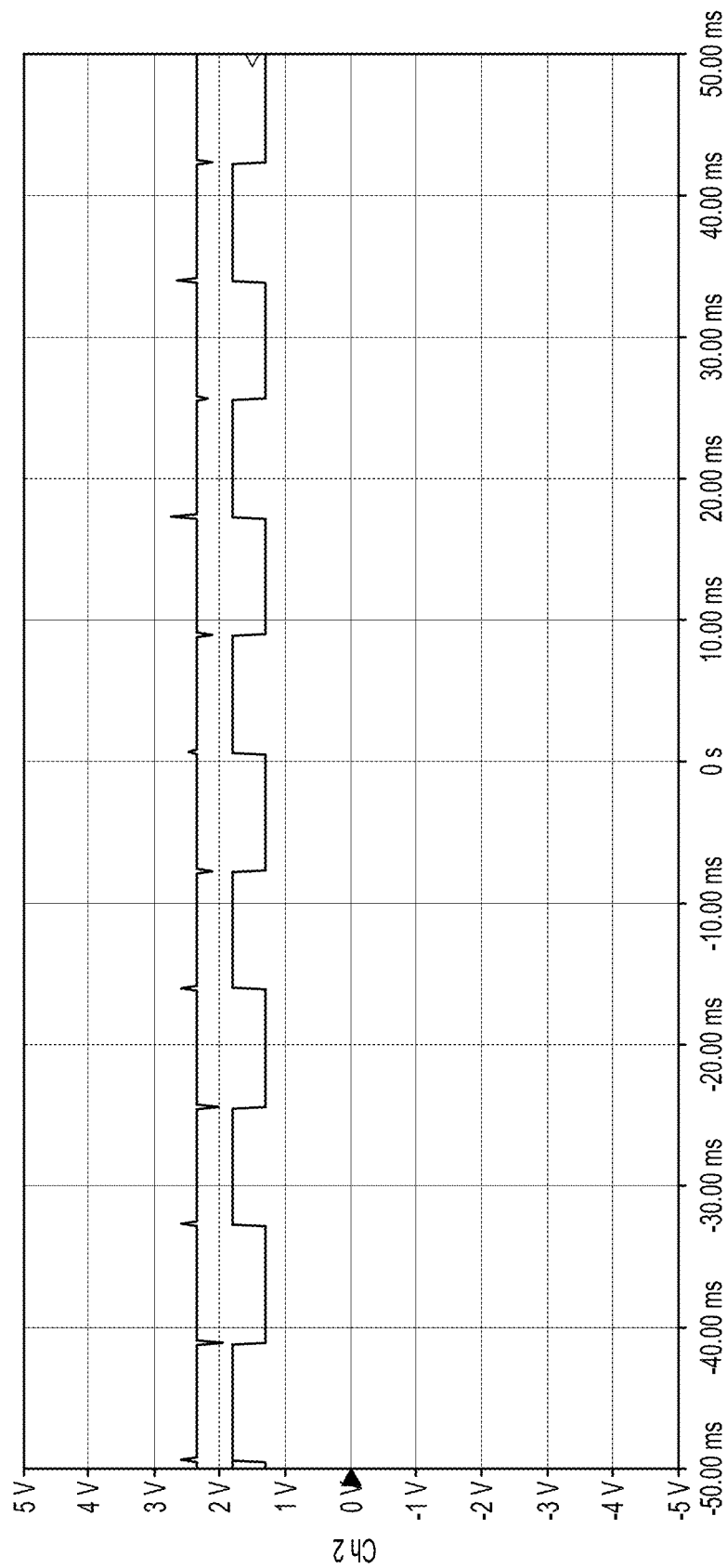
FIG. 46 illustrates low-frequency signals also being absorbed by the filter.

FIG. 46 illustrates low-frequency signals (lower line) also being absorbed by the filter (output upper line).

Another feature that was considered was a phase-locked loop (PLL). This technology fine-tunes the period and phase of a clock generator with information recovered from an incoming signal, allowing the decoder to synchronize its signal sensing attempts with the emissions of the transmitter. This means that the decoder no longer needs to keep track of synchronization with the signal and, in the case of the code-division system, allows it to continually sample the signal over its entire period, since the full period is now known. This repeated sampling allows for greater accuracy, a very large range increase, and high immunity to noise. While it has the most effect for a Code Division system, it is still useful for digital signals as well as it would greatly simplify the eventual solution of ignoring level transitions seen at the wrong time. In some embodiments, software workarounds, like ignoring level transitions based on timing, or clock recovery via double-sampling and alignment of chip codes, can be used in the decoder to reach reasonable levels of performance. Ongoing research will include the exploration of the use of a PLL for further improvements, which, together with the faster hardware of an FPGA, should allow a great increase in speed and an improvement in distance even over that seen in this design.

Future designs can also likely increase the amount of data carried per frame in this protocol for a higher data-to-overhead ratio and increased overall data rate. The current implementation limited the length of the frames due to the desire to reduce the number of bytes corrupted in any given error event before the end of the frame would force a resynchronization with the transmitter. With the expected gain in distance and accuracy from the use of PLL, it should be possible to increase the frame size while still observing a reduction in the number of erroneous data bytes.

A final method to increase speed might be the employment of micro-LEDs. This new technology is being used for the highest-speed VLC designs in use today, and works by disrupting the alignment of the LEDs' native piezoelectric effect. With it disrupted, electrons and holes formed by current flowing through the LED will recombine more quickly, resulting in even higher switching speeds as the LED can remain lit for less time after a current pulse. It also allows for a higher power output per LED, allowing for a potential increase in range for the same size of headlamp. This technology can be used for the highest-speed system, assuming that the receiver circuit is capable of operating on that sort of bandwidth.

Conclusion

The present disclosure investigates and improves the performance of outdoor VLC devices, particularly those intended for communication between connected vehicles to alleviate RF spectrum overuse. It has proven possible to filter out signal inconsistencies from ambient light, improving the performance of the system and removing the need for calibration to the environment. The system's dual amplifier design nearly immunizes the receiver circuitry from light saturation by offloading some of the gain away from the vulnerable sensor circuit. The Code Division algorithm for data transmission also appears promising for reducing noise and improving the reception range of the receiver. In summary, the VLC system 10 provides a reasonable hardware design capable of excellent performance regardless of the ambient light level and, combined with proper protocol support and hardware decoding, could be used to design a high-speed and long-range VLC communications system for inter-vehicular use.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of preprocessing an optical signal so as to filter out ambient light and accommodate for differences in signal level to enhance Visible Light Communication (VLC) operation, the method comprising:

detecting a light input via a photodetector and amplifying an output of the photodetector via a first amplifier and outputting an amplified detected signal representative of the light input, the light input having both the optical signal and the ambient light;

filtering out the ambient light of the amplified output of the photodetector and outputting a filtered signal, wherein the filtering removes portions of the detected signal that are not at a same modulation frequency as the optical signal; and increasing an amplitude of the filtered signal in a second amplifier, the second amplifier being a variable amplifier that is controlled at variable gain settings by a controller based upon an an amplitude capture stage that captures an amplitude of the filtered signal.

2. The method according to claim 1, wherein the filtering out the ambient light of the amplified output of the photodetector comprises filtering out the ambient light of the detected signal via a bandpass filter.

3. The method according to claim 1, wherein the amplitude capture stage includes reading an amplitude of the filtered signal via a diode and storing the amplitude value in a capacitor.

4. A preprocessing system for preprocessing an optical signal so as to filter out ambient light and accommodate for differences in signal level to enhance Visible Light Communication (VLC) operation, comprising:

a photodetector configured to detect light and amplifying an output of the photodetector via a first amplifier and outputting an amplified detected signal, the light input having both the optical signal and the ambient light;

an analog filter configured to remove the ambient light of the amplified output of the photodetector and output a filtered signal, wherein the analog filter is configured to operate in a bandpass mode to remove portions of the detected signal that are not at a same modulation frequency as the optical signal; and a second amplifier configured to increase an amplitude of the filtered signal, the second amplifier being a variable amplifier that is controlled at variable gain settings by a controller based upon an amplitude capture stage that captures an amplitude of the filtered signal.

5. The method according to claim 4, wherein the amplitude capture stage includes reading an amplitude of the filtered signal via a diode and storing the amplitude value in a capacitor.

* * * * *